US012810490B2

(12) United States Patent
Hidaka

(10) Patent No.: US 12,810,490 B2
(45) Date of Patent: Nov. 24, 2026

(54) INFORMATION PROCESSING APPARATUS CAPABLE OF EASILY INSERTING AI IMAGE GENERATED BY DESIRED KEYWORD INTO DESIRED REGION OF IMAGE, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Keita Hidaka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 18/814,797

(22) Filed: Aug. 26, 2024

(65) Prior Publication Data

US 2025/0086378 A1 Mar. 13, 2025

(30) Foreign Application Priority Data

Sep. 12, 2023 (JP) ................................. 2023-147574

(51) Int. Cl.
*G06T 11/00* (2026.01)
*G06F 40/166* (2020.01)
*G06T 11/60* (2006.01)

(52) U.S. Cl.
CPC ............ *G06T 11/00* (2013.01); *G06F 40/166* (2020.01); *G06T 11/60* (2013.01); *G06T 2200/24* (2013.01)

(58) Field of Classification Search
CPC ........................................................ G06T 11/00
USPC .......................................................... 715/201
See application file for complete search history.

(56) References Cited

U.S. PATENT DOCUMENTS 6,308,031 B1 * 10/2001 Hiroe ................... G03G 15/757 399/167
11,353,953 B2 * 6/2022 Pepperell .............. G06T 19/003
11,682,105 B2 * 6/2023 Duan ...................... G06T 11/60 345/667
2008/0285887 A1 * 11/2008 Wanda .................. G06T 15/503 382/284
2009/0122081 A1 * 5/2009 Tsubaki .................... G06F 3/14 345/619
2013/0229487 A1 * 9/2013 D'Amato ............. H04N 13/156 348/43
2017/0329564 A1 * 11/2017 Mastie .................. G06F 3/1288
2018/0012356 A1 * 1/2018 Madabhushi .......... A61B 6/032
2018/0052934 A1 * 2/2018 Li ......................... G06F 16/538
(Continued)

FOREIGN PATENT DOCUMENTS

JP 2008-158602 A 7/2008

*Primary Examiner* — Reza Nabi
(74) *Attorney, Agent, or Firm* — Venable LLP

(57) ABSTRACT

A mechanism capable of easily inserting an AI image generated by a desired keyword into a desired region of an image is provided. An information processing apparatus includes a region designating device that designates a region for inserting an AI image from an image, a first keyword obtaining device that obtains a keyword of the AI image, at least one processor, and a memory coupled to the processor storing instructions that, when executed by the processor, cause the processor to function as an AI image obtaining unit that obtains an AI image generated by inputting input data including the obtained keyword into a trained model, and an inserting unit that inserts the obtained AI image into the designated region of the image.

17 Claims, 30 Drawing Sheets

(56) References Cited

U.S. PATENT DOCUMENTS

| | | | | |
|---|---|---|---|---|
| 2018/0060359 | A1* | 3/2018 | Li | G06F 16/24578 |
| 2018/0084119 | A1* | 3/2018 | Yoshida | G03B 27/46 |
| 2021/0027645 | A1* | 1/2021 | Nicol | H04L 67/131 |
| 2022/0414820 | A1* | 12/2022 | Zikos | G06T 3/14 |
| 2023/0142630 | A1* | 5/2023 | Brodie | G06T 5/50<br>382/157 |
| 2023/0360397 | A1* | 11/2023 | Tuxen | H04N 23/90 |
| 2024/0163402 | A1* | 5/2024 | Kario | G06V 20/58 |
| 2024/0338869 | A1* | 10/2024 | Zhou | G06T 11/60 |
| 2025/0086378 | A1* | 3/2025 | Hidaka | G06T 11/00 |
| 2025/0200843 | A1* | 6/2025 | Wilson | G06T 7/60 |
| 2025/0238245 | A1* | 7/2025 | Gupta | G06F 9/451 |
| 2025/0308109 | A1* | 10/2025 | Nitzan | G06T 11/60 |
| 2025/0336128 | A1* | 10/2025 | Song | G06T 11/60 |
| 2025/0378468 | A1* | 12/2025 | Fortune | G06Q 30/0255 |
| 2026/0099968 | A1* | 4/2026 | Leroux | G06T 11/60 |
| 2026/0120368 | A1* | 4/2026 | Jeong | G06T 11/60 |
| 2026/0141592 | A1* | 5/2026 | Cohen-Tidhar | G06T 11/60 |

* cited by examiner

FIG. 11A

INFORMATION ABOUT THE SOCIAL GATHERING

Although it's the height of summer, we will be holding a social gathering to deepen our friendships!
We will be serving delicious seafood and alcohol, so please come along!

DATE AND TIME: FROM XX MONTH/YY DAY/ZZ TIME
LOCATION: XX CUISINE YYY
FEE: ZZZZ YEN

DOCUMENT BODY TEXT DOCUMENT BODY TEXT
DOCUMENT BODY TEXT DOCUMENT BODY TEXT
DOCUMENT BODY TEXT DOCUMENT BODY TEXT
DOCUMENT BODY TEXT DOCUMENT BODY TEXT
DOCUMENT BODY TEXT DOCUMENT BODY TEXT
DOCUMENT BODY TEXT DOCUMENT BODY TEXT
DOCUMENT BODY TEXT DOCUMENT BODY TEXT
DOCUMENT BODY TEXT DOCUMENT BODY TEXT

P1

INFORMATION PROCESSING APPARATUS CAPABLE OF EASILY INSERTING AI IMAGE GENERATED BY DESIRED KEYWORD INTO DESIRED REGION OF IMAGE, CONTROL METHOD FOR INFORMATION PROCESSING APPARATUS, AND STORAGE MEDIUM

BACKGROUND OF THE INVENTION

Field of the Invention

The present invention relates to an information processing apparatus, a control method for the information processing apparatus, and a storage medium, and more particularly to an information processing apparatus that inserts an image into a document, a control method for the information processing apparatus, and a storage medium.

Description of the Related Art

Conventionally, when editing a document by using a computer, in order to insert an image into the document, a user has to obtain a necessary image from the Internet or the like and then insert it into the document.

Japanese Laid-Open Patent Publication (kokai) No. 2008-158602 has disclosed a mechanism that composites an image possessed by a user with image material data prepared on the server side, and provides the obtained composite image to the user.

In addition, in recent years, a service has become known that allows a user to input (enter) a keyword into document editing software and be provided with an image generated by image generation artificial intelligence (image generation AI) based on the inputted keyword, making it possible to prepare the image the user needs on the spot.

However, in the case that the user inserts an image obtained from the Internet or the like, or an image generated by the image generation AI into a document, the size of the image may not be a size suitable for a region in the document where the user wants to place the image. In such a case, it becomes necessary to trim, enlarge or reduce the image to be inserted into the document so as to fit into the region in the document where the user wants to place the image, which is time-consuming. In addition, trimming may also destroy the original balance of the image.

In addition, it is generally known that the composition of an image generated by the image generation AI is greatly affected by its size and aspect ratio, so it is desirable for the image generation AI to generate an image with the size actually required.

SUMMARY OF THE INVENTION

The present invention provides a mechanism capable of easily inserting an AI image generated by a desired keyword into a desired region of an image.

Accordingly, the present invention provides an information processing apparatus comprising a region designating device that designates a region for inserting an AI image from an image, a first keyword obtaining device that obtains a keyword of the AI image, at least one processor, and a memory coupled to the processor storing instructions that, when executed by the processor, cause the processor to function as an AI image obtaining unit that obtains an AI image generated by inputting input data including the obtained keyword into a trained model, and an inserting unit that inserts the obtained AI image into the designated region of the image.

According to the present invention, it is possible to easily insert the AI image generated by the desired keyword into the desired region of an image.

Further features of the present invention will become apparent from the following description of exemplary embodiments with reference to the attached drawings.

BRIEF DESCRIPTION OF THE DRAWINGS

FIGS. 11A, 11B, 11C, and 11D are diagrams for explaining a first modification of the image inserting processing in the third embodiment of the present invention.

DESCRIPTION OF THE EMBODIMENTS

The present invention will now be described in detail below with reference to the accompanying drawings showing embodiments thereof.

Hereinafter, preferred embodiments of the present invention will be described in detail with reference to the accompanying drawings. It should be noted that the following embodiments do not limit the present invention as defined by the claims, and not all of the combinations of features described in each of the following embodiments are necessarily essential to the solving means of the present invention.

First, a first embodiment of the present invention will be described. Hereinafter, a configuration of an information processing system 1 including a general purpose computer 102 as an information processing apparatus according to the first embodiment will be described with reference to FIGS. 1A to 1C.

Figure 1A:
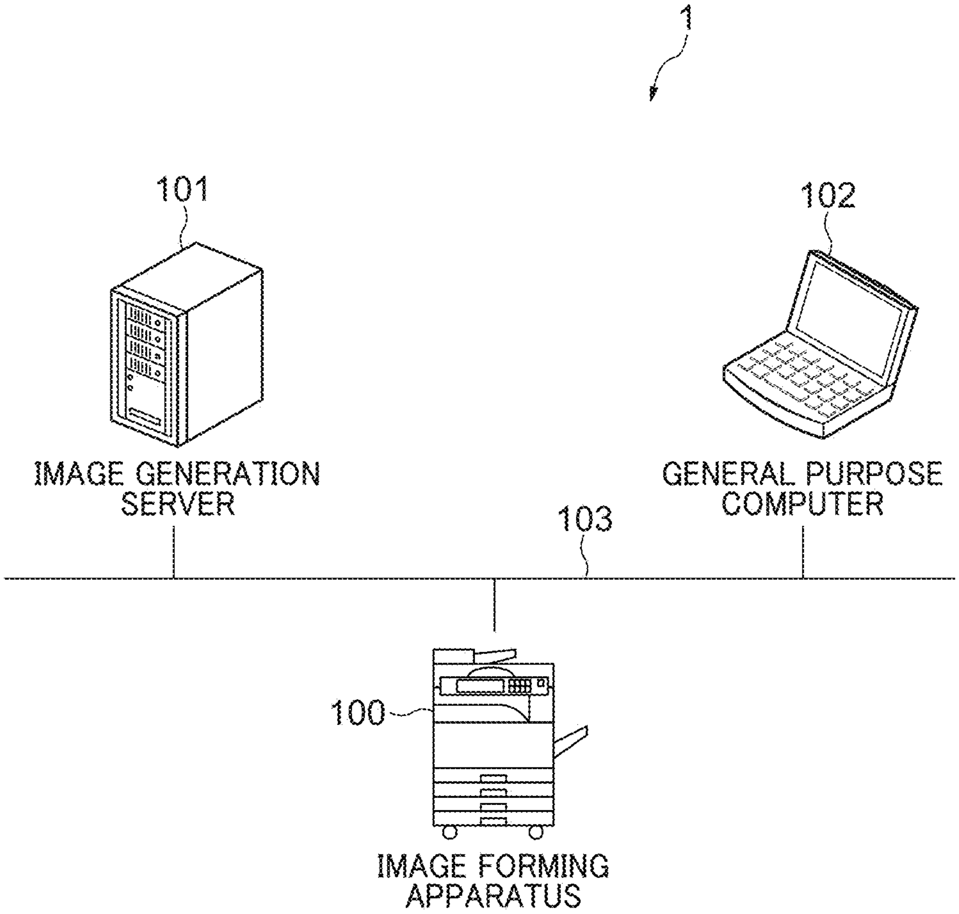
FIG. 1A is a schematic diagram of a network configuration of an information processing system including a general purpose computer as an information processing apparatus according to a first embodiment of the present invention.

FIG. 1A is a schematic diagram of a network configuration of the information processing system 1.

As shown in FIG. 1A, in the information processing system 1, an image generation server 101, the general purpose computer 102, and an image forming apparatus 100 are connected to a local area network (a LAN) 103. The LAN 103 may be either a wired network or a wireless network.

The configuration of the present invention is sufficient if it has either the general purpose computer 102 or the image forming apparatus 100 as the information processing apparatus, and does not necessarily have to have both. In the first embodiment, since the general purpose computer 102 functions as the information processing apparatus according to the present invention, the image forming apparatus 100 may not be included in the information processing system 1. On the other hand, in a second embodiment of the present invention described below, since the image forming apparatus 100 functions as the information processing apparatus according to the present invention, the general purpose computer 102 may not be included in the information processing system 1. The general purpose computer 102 or the image forming apparatus 100 communicates with the image generation server 101 via the LAN 103, transmits an instruction to generate an AI image, and receives the generated image, thereby obtaining the AI image. It should be noted that AI is an abbreviation for artificial intelligence. In addition, in the case that the general purpose computer 102 or the image forming apparatus 100 has sufficient computing power for AI image generation, the image generation server 101 may not be required. In this case, the general purpose computer 102 or the image forming apparatus 100 (an AI image obtaining unit) obtains an AI image by performing the AI image generation within the general purpose computer 102 or the image forming apparatus 100.

Since the details of the image forming apparatus 100 will be described with reference to FIG. 7, the description thereof will be omitted here.

Figure 1B:
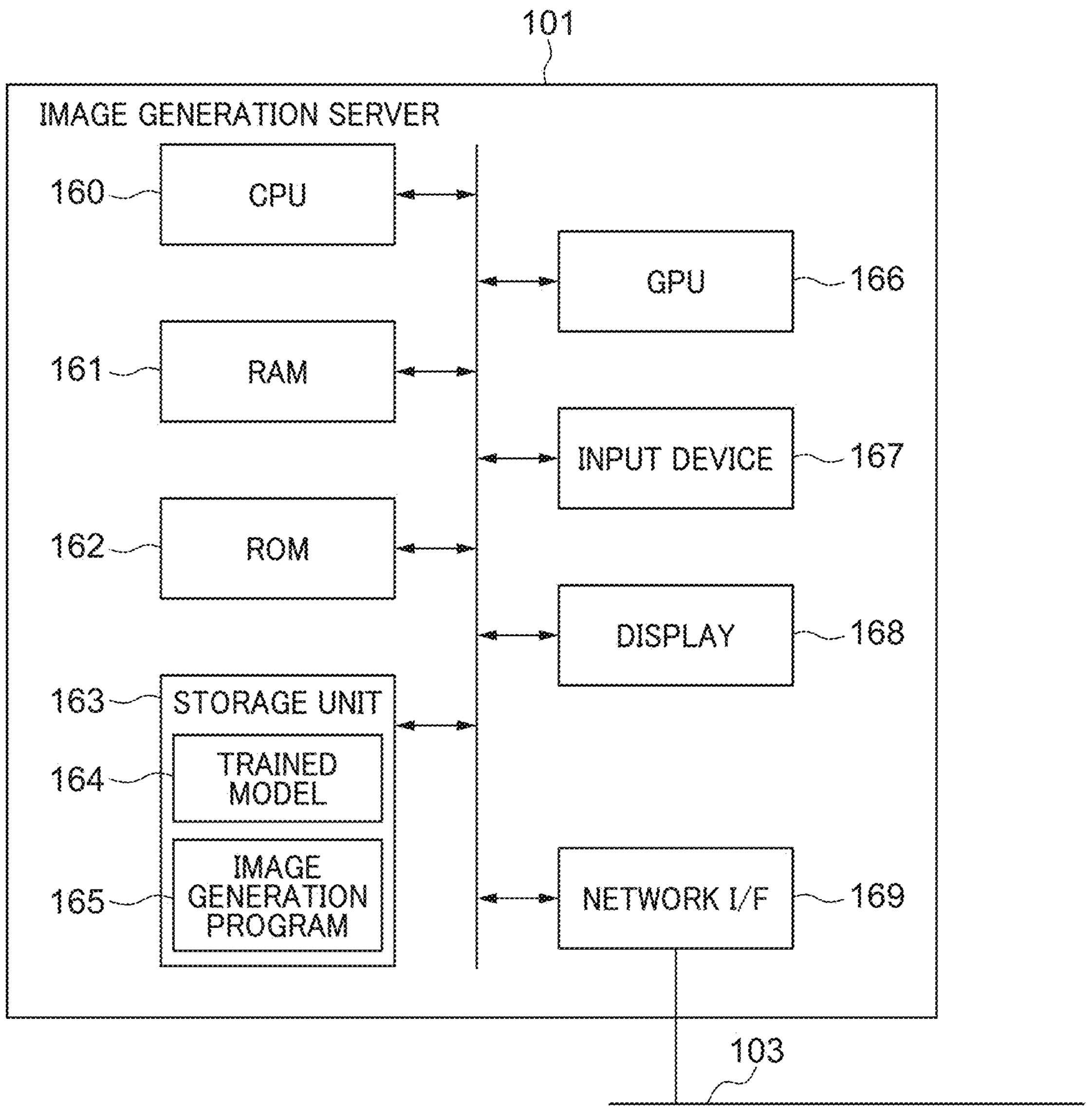
FIG. 1B is a block diagram that shows a hardware configuration of an image generation server shown in FIG. 1A.

FIG. 1B is a block diagram that shows a hardware configuration of the image generation server 101.

As shown in FIG. 1B, the image generation server 101 includes a central processing unit (a CPU) 160, a random-access memory (a RAM) 161, a read only memory (a ROM) 162, a storage unit 163, a graphics processing unit (a GPU) 166, an input device 167, a display 168, and a network interface (a network I/F) 169.

The CPU 160 controls the operations of the image generation server 101, and operates based on a program stored in the RAM 161. The ROM 162 is a boot ROM, and stores a boot program for an operating system (an OS) that runs the image generation server 101. The storage unit 163 is a non-volatile device such as a hard disk drive (an HDD) or a solid state drive (an SSD), and stores at least one or more trained models 164 used in the AI image generation and at least one or more image generation programs 165 used in the AI image generation.

Here, in the first embodiment, the GPU 166, which functions as an image generation means, uses an arbitrary trained model as the trained model 164, and uses Stable Diffusion, which is an existing program, as the image generation program 165. However, the image generation program 165 does not have to be an existing program, and may be any other program as long as it is an image generation program. Data of the trained model 164 and data of the image generation program 165 are loaded into the RAM 161 and executed by the GPU 166. Since the technique for the AI image generation is a publicly-known technique, details thereof will be omitted.

In the image generation server 101, in response to an instruction from the CPU 160, the GPU 166 inputs parameters included in an AI image generation request as input data into the trained model 164, and performs an AI image generation processing that outputs an AI image. The generated AI image is transmitted to the image forming apparatus 100 and/or the general purpose computer 102 via the LAN 103, and/or is stored in the RAM 161 and/or the storage unit 163. It should be noted that the details of the AI image generation request will be described below.

The input device 167 is an input device including, for example, a mouse and a keyboard, and the display 168 is a display device that displays a predetermined screen by the image generation server 101. The network I/F 169 is connected to the LAN 103 and controls input and output of various kinds of information via the network.

Figure 1C:
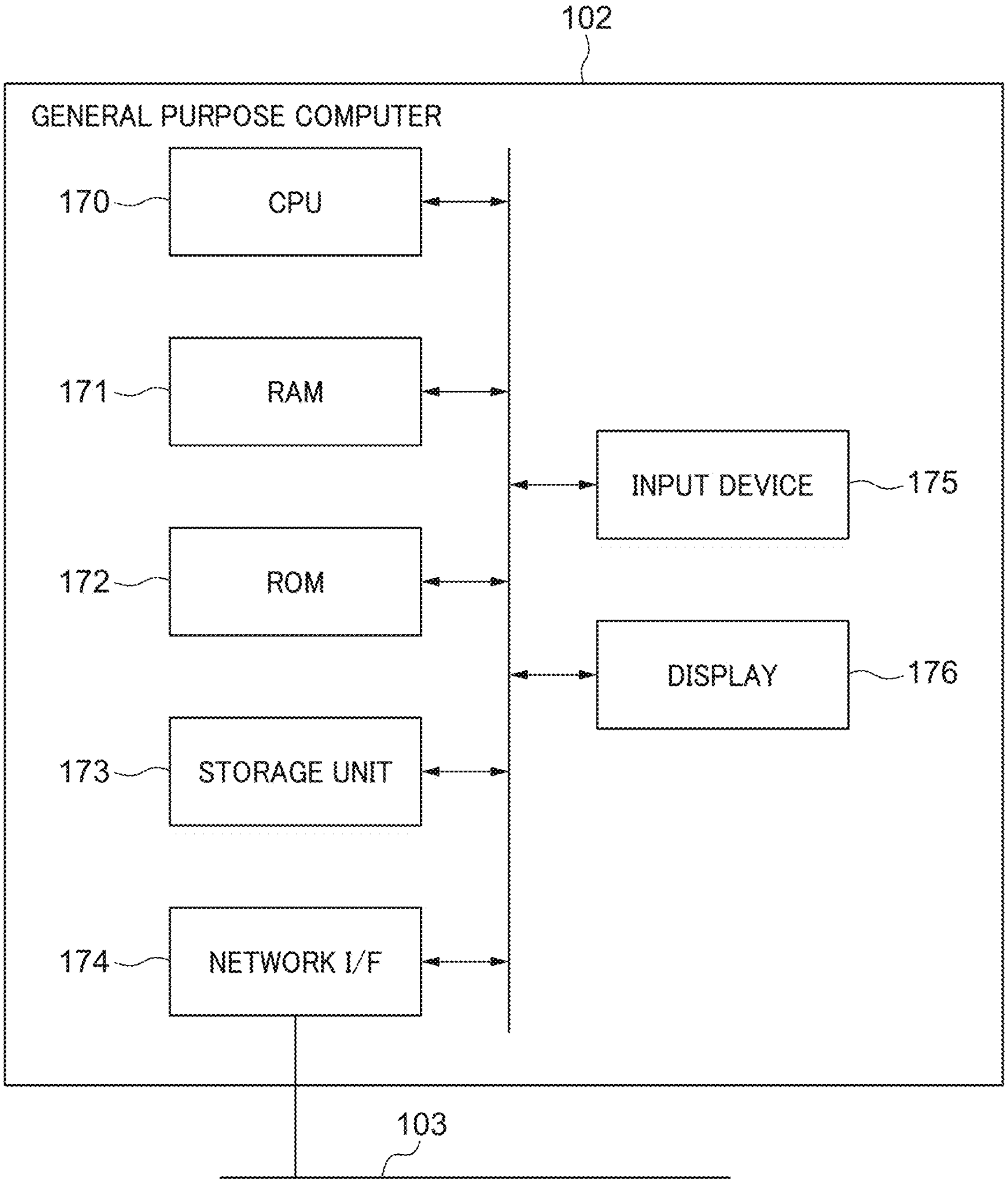
FIG. 1C is a block diagram that shows a hardware configuration of the general purpose computer shown in FIG. 1A.

FIG. 1C is a block diagram that shows a hardware configuration of the general purpose computer 102.

The general purpose computer 102 is a device including various kinds of units shown in FIG. 1C, such as a personal computer (a PC), a smartphone, or a tablet.

As shown in FIG. 1C, the general purpose computer 102 includes a CPU 170, a RAM 171, a ROM 172, a storage unit 173, a network I/F 174, an input device 175, and a display 176.

The CPU 170 controls the operations of the general purpose computer 102, and operates based on a program stored in the RAM 171. The ROM 172 is a boot ROM, and stores a boot program for an OS that runs the general purpose computer 102.

The storage unit 173 is a non-volatile device such as an HDD or an SSD, and stores system software, programs for controlling the operations of the general purpose computer 102, etc. The program stored in the storage unit 173 is loaded into the RAM 171, and the CPU 170 controls the operations of the general purpose computer 102 based on this program.

The input device 175 is an input device including, for example, a mouse and a keyboard, and the display 176 is a display device that displays a predetermined screen by the general purpose computer 102. In the case that the general purpose computer 102 is a tablet or a smartphone, the input device 175 and the display 176 may be integrated as a touch panel. The network I/F 174 is connected to the LAN 103 and controls input and output of various kinds of information via the network.

By loading document editing software stored in the storage unit 173 into the RAM 171, or by executing a cloud-based document editing service or the like that is executable via the LAN 103 by the CPU 170, the general purpose computer 102 allows editing of document data. It should be noted that the document data may be image data and does not necessarily have to include a document.

In the case that the general purpose computer 102 includes a GPU (not shown in FIG. 1C) and has sufficient computing power to execute the AI image generation, the image generation server 101 is not required, and the general purpose computer 102 may execute the AI image generation by the GPU included in the general purpose computer 102. In this case, the trained model(s) 164 and the image generation program(s) 165 are stored in the storage unit 173 of the general purpose computer 102.

Hereinafter, an example in which a PC is used as the general purpose computer 102 will be described.

Here, in the first embodiment, two examples of a method by which a user is able to insert a material image, which is an AI image, into a document will be described.

Figure 3A:
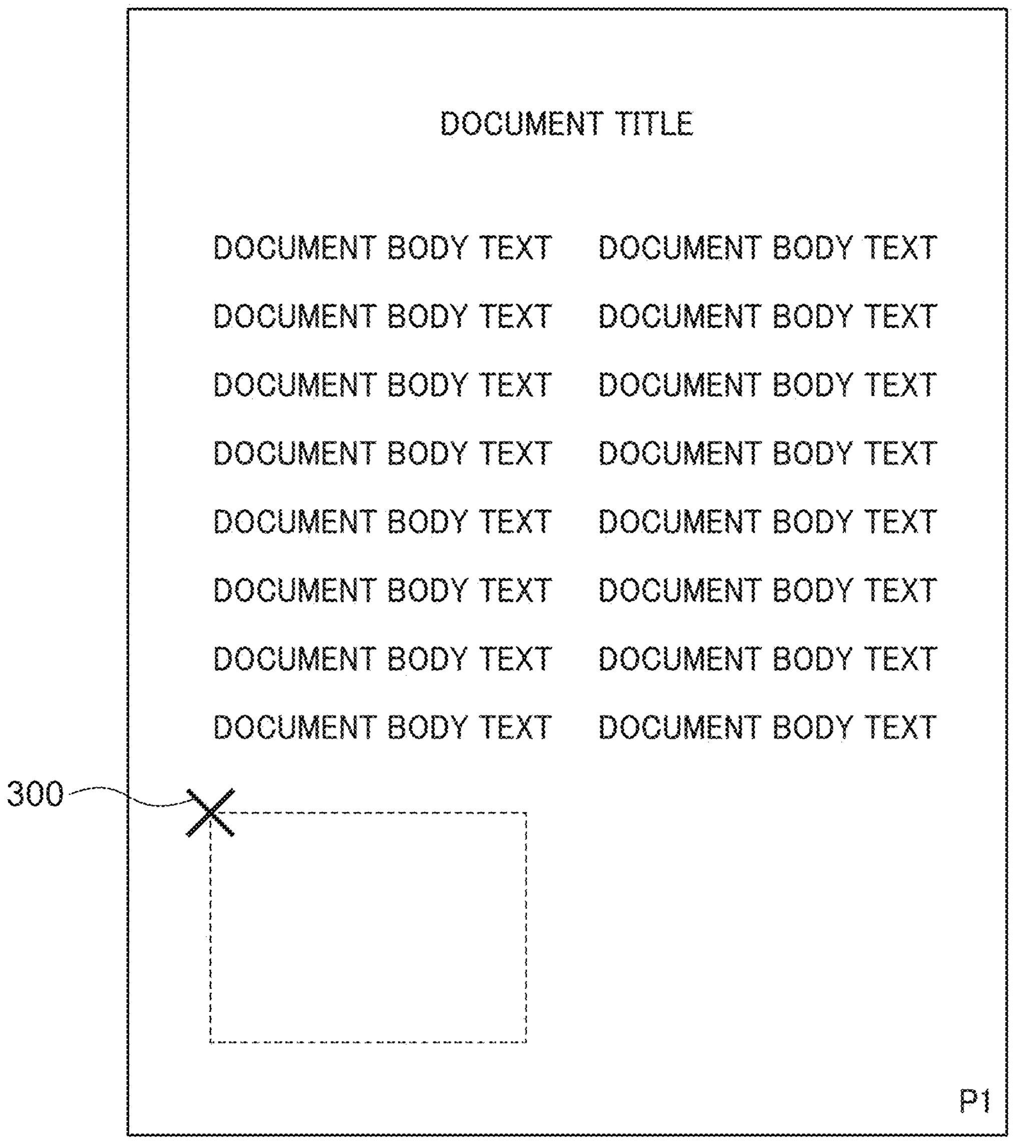
FIGS. 3A, 3B, 3C, 3D, and 3E are diagrams for explaining a specific example of the image inserting processing in the first embodiment of the present invention.

FIG. 3A is a diagram that shows a document image being edited by the document editing software of the general purpose computer 102. The document image is displayed on the display 176 by the document editing software, and the screen is operable by the input device 175. Information such as a title, a body text, and a page number is inputted (entered) into the document which is an example. The first method (the first example of the method by which a user is able to insert a material image, which is an AI image, into a document) will be described with reference to FIG. 3A.

In the first method, the user designates a position in the document where he or she wants to insert the AI image by coordinates on the display 176. In the first embodiment, an image generation button (not shown) is provided near the document image of FIG. 3A displayed by the document editing software on the display 176, and when the image generation button is selected by the user, shifting to a mode for designating a position 300 by the coordinates. After shifting to this mode, the user is able to designate the coordinates of the position 300 (see FIG. 3A) in the document image (a region designating UI) displayed on the display 176 by the left click operation of the mouse (the input device 175: a region designating device). It should be noted that UI is an abbreviation for user interface.

It should be noted that the method is not limited to the method of the first embodiment (the first method) as long as it is a method by which the user is able to designate the coordinates. For example, when the user selects the coordinates of any position on the document image of FIG. 3A by the left click operation of the mouse (the input device 175) and then performs the right click operation, the document editing software may display, on the display 176, a menu that includes an item for the image generation. In this case, when the user selects the item for the image generation from the menu, the position selected by the left click operation is designated as the coordinates for inserting the AI image into the document. The user may designate the coordinates for inserting the AI image into the document by other method.

Figure 3B:
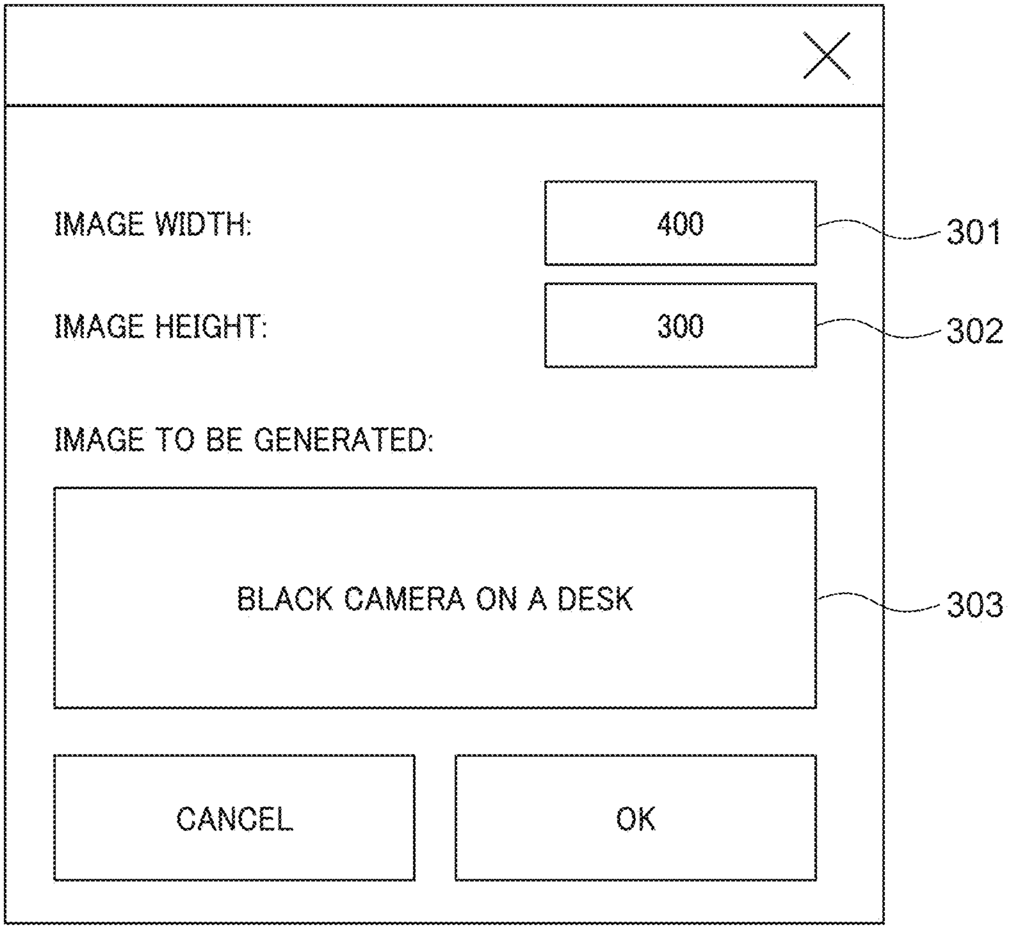

When the coordinates of the position 300 are designated, a window shown in FIG. 3B (an AI image information designating UI) is then displayed on the display 176. FIG. 3B is an image diagram of a window for designating information about an AI image to be generated.

As shown in FIG. 3B, the user inputs numerical values indicating the size of the AI image to be generated, that is, width information 301 and height information 302, by using the keyboard (the input device 175). Furthermore, the user character-inputs a keyword 303 of the AI image to be generated by using the keyboard (the input device 175: a first keyword obtaining device). When these inputs are completed and the user selects an OK button (see FIG. 3B), the CPU 170 generates an AI image generation request that includes the width information 301, the height information 302, and information on the keyword 303. Then, the CPU 170 (the AI image obtaining unit) transmits the AI image generation request to the image generation server 101 via the LAN 103 to obtain the AI image from the image generation server 101.

In the image generation server 101, the GPU 166 inputs the parameters such as the keyword 303, the width information 301, and the height information 302 that are included in the AI image generation request transmitted from the general purpose computer 102 into the trained model 164 as the input data. After that, the GPU 166 executes an inference processing using the trained model 164 (an inference processing based on the trained model 164) and generates an AI image based on the keyword 303 with the size (the width and the height) designated by the width information 301 and the height information 302. When the generation of the AI image is completed, the CPU 160 transmits the generated AI image to the general purpose computer 102.

The AI image generation request includes the width information 301, the height information 302, and the information on the keyword 303 that have been described above, as well as parameters required for the generation of the AI image. For example, the parameters required for the generation of the AI image include the number of rendering steps, which indicates how many times the update of the image is performed internally in one time of the image generation, and a scale value, which indicates to what extent the keyword is taken into consideration when performing the image generation. In addition, the parameters required for the generation of the AI image also include information such as a seed value, which is basically a random value, used in the initial state of the AI image generation, and the type of a sampler to be used in the update of the image. These pieces of information may be fixed values, or may be values set by the document editing software. However, it is preferable that as the seed value, a random value is designated by random numbers each time the image generation is performed.

The configuration of the AI image generation request is not limited to the configuration of the AI image generation request in the first embodiment. For example, the AI image generation request may not include the information such as the number of the rendering steps described above, and the image generation server 101 may assign fixed values or designated values of these pieces of information. Even in this case, it is preferable that as the seed value, a random value is designated by random numbers each time the image generation is performed.

In addition, in the first embodiment, as shown in FIG. 3B, the keyword 303 inputted by the user is "black camera on a desk", but other keywords may be added to the keyword 303. For example, a keyword for generating a high-quality image such as "best quality" or the like may be added. In addition, for example, in the case that the document being edited is a business document, a keyword such as "business" or "work" may be added as the theme of the image to be generated.

Furthermore, in addition to the keyword 303 indicating the characteristics of the AI image to be generated, the user may input a negative keyword, which designates target(s) that the user does not want to appear in the AI-generated image, into the window shown in FIG. 3B. In this case, the AI image generation request, which also includes the negative keyword inputted by the user, is transmitted to the image generation server 101.

Figure 3C:
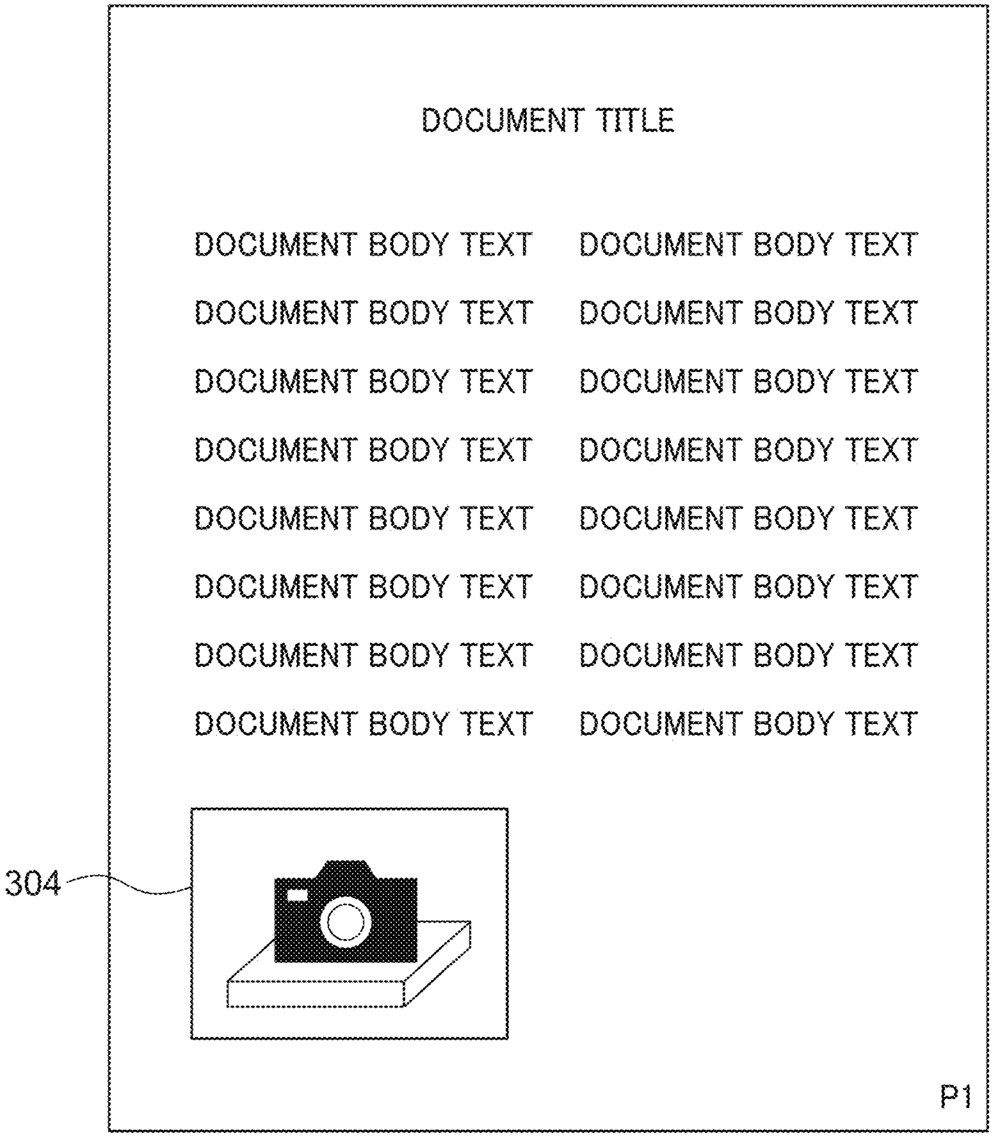

FIG. 3C is a diagram that shows a document image in which the AI image generated by the image generation server 101 is inserted into the document. The CPU 170 (an inserting unit) inserts a preview image of the AI image received from the image generation server 101 as an image 304 into a region starting from the position 300 on the document image. The image 304 shown in FIG. 3C is merely an example and is not an image generated by the image generation AI, but in reality it is an image generated by the image generation AI. The document image shown in FIG. 3C is displayed on the screen of the display 176 by the document editing software when the document editing software obtains the AI image generated by the image generation server 101.

As a result, it is possible to insert the material image (the AI image) with a desired size at a designated position in the document.

Although not shown in FIGS. 3A, 3B, 3C, 3D, and 3E, a message such as "AI image being generated" may be displayed on the display 176 during a period from when the user selects the OK button on the window shown in FIG. 3B until the document image shown in FIG. 3C is displayed on the display 176. In addition, the user may be able to designate a plurality of positions in the document image of FIG. 3A where he or she wants to insert the AI image, and may be able to make the AI image generation request for each of the plurality of positions on the window shown in FIG. 3B. In this case, while the first requested AI image is being generated, a message such as "first AI image being generated" may be displayed on the display 176, and while the second requested AI image is being generated, a message such as "second AI image being generated" may be displayed on the display 176. As a result, when the AI image generation takes time and it takes time to display the document image shown in FIG. 3C, the user is able to be notified of this.

In addition, the image generation server 101 may generate a plurality of AI images at one time. In this case, the CPU 170 may be configured to present the plurality of AI images generated by the image generation server 101 on the display 176 in a user-selectable manner, and insert the AI image selected by the user into the document.

In addition, the larger the image size of the image generated by the image generation AI, the finer the image generated by the image generation AI tends to be. Therefore, instead of the image size designated by the width information 301 and the height information 302, a value obtained by multiplying the image size by a certain amount may be notified to the image generation server 101 as an AI image generation request. As a result, it is possible to cause the GPU 166 to generate a fine AI image whose image size is larger than the image size designated by the width information 301 and the height information 302. In this case, the document editing software is able to reduce the received AI image to a designated image size and insert it into a designated region of the document, but the time the GPU 166 takes to generate the AI image will increase.

Figure 3D:
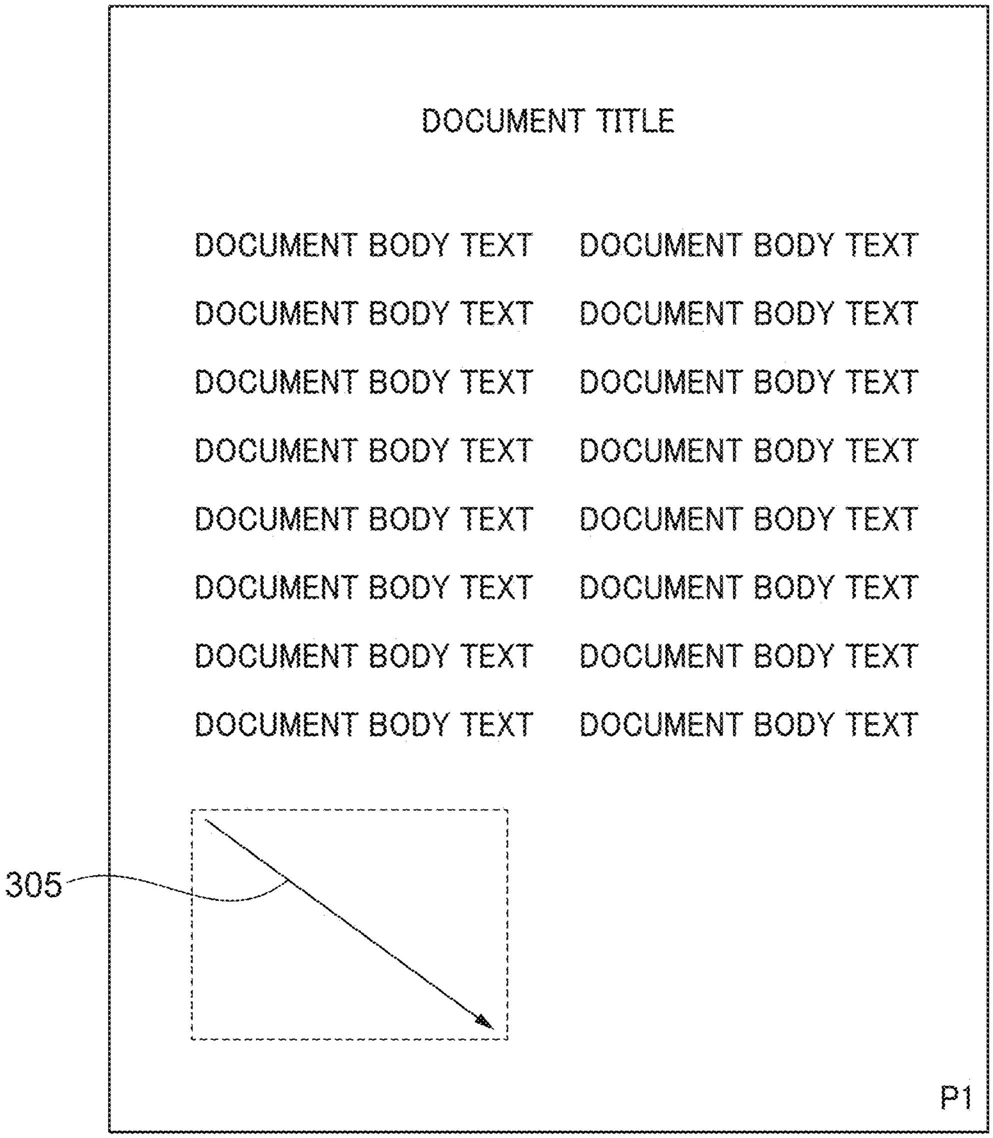

FIG. 3D is a diagram that shows another document image being edited by the document editing software of the general purpose computer 102. The second method (the second example of the method by which a user is able to insert a material image, which is an AI image, into a document) will be described with reference to FIG. 3D.

In the second method, the user designates a region in the document where he or she wants to insert the AI image by using a vector 305. In the first embodiment, an image generation button (not shown) is provided near the document image of FIG. 3D displayed by the document editing software on the display 176, and when the image generation button is selected by the user, shifting to a mode for designating a region. After shifting to this mode, the user is able to designate the region in the document image (the region designating UI) displayed on the display 176 by dragging the vector 305 shown in FIG. 3D with the mouse (the input device 175: the region designating device).

It should be noted that the method is not limited to the method of the first embodiment (the second method) as long as it is a method by which the user is able to designate the region. For example, when the user designates the region by dragging the vector 305 shown in FIG. 3D with the mouse (the input device 175) and then performs the right click operation, the document editing software may display, on the display 176, a menu that includes an item for the image generation. In this case, when the user selects the item for the image generation from the menu, the region designated by the vector selected by a dragging-while-left-clicking operation is set as the region where the AI image will be inserted. The user may designate the vector designating the region for inserting the AI image into the document by other method.

Figure 3E:
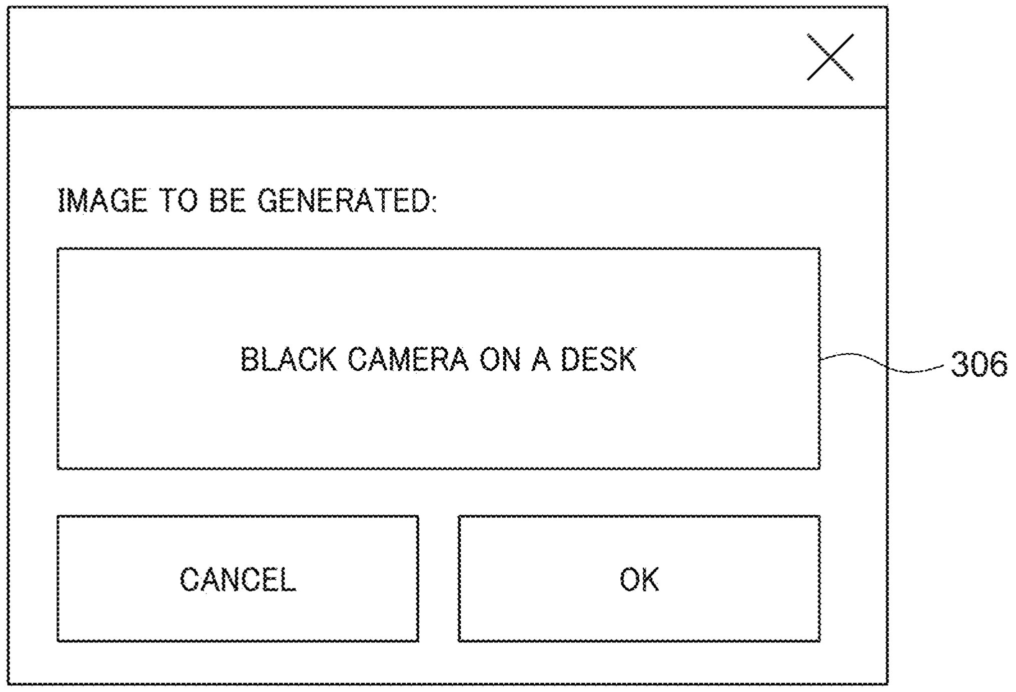

When the region is designated by the vector 305, a window shown in FIG. 3E is then displayed on the display 176. FIG. 3E is a diagram that shows a window for designating information about an AI image to be generated.

Since the width and the height of the AI image to be generated are determined based on the vector 305, the user inputs only a keyword 306 of the AI image to be generated by using the keyboard (the input device 175: the first keyword obtaining device). When the input is completed and the user selects an OK button (see FIG. 3E), the CPU 170 transmits an AI image generation request that includes the width and the height of the image determined based on the vector 305, and information on the keyword 306 to the image generation server 101 via the LAN 103. The subsequent processing is the same as in the first method, and the CPU 170 inserts a preview image of the received AI image data into the document as the image 304 shown in FIG. 3C.

Figure 2:
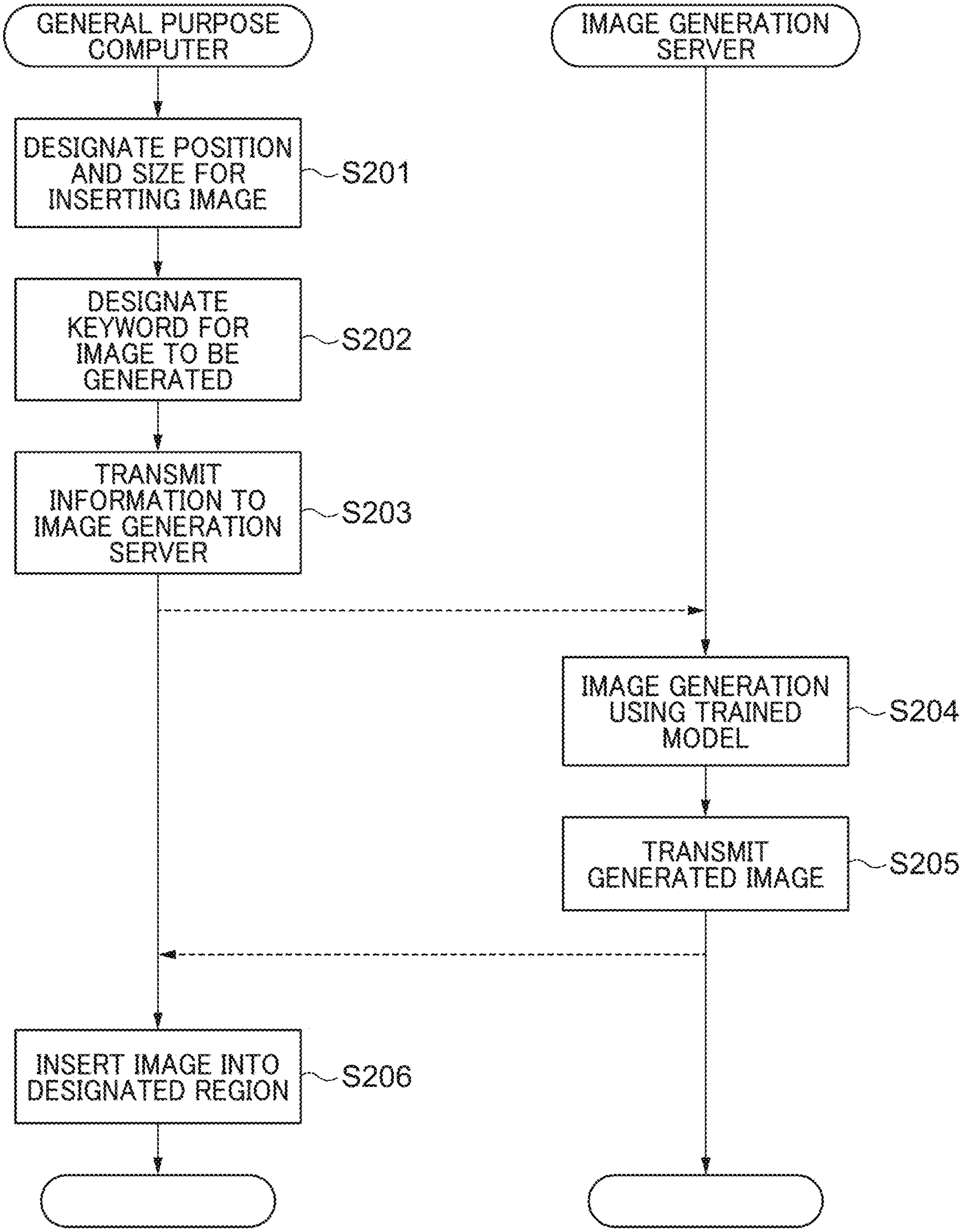
FIG. 2 is a flowchart of an image inserting processing in the first embodiment, which is executed in the general purpose computer and the image generation server.

Compared to the first method, the second method allows the user to intuitively designate the region where the image will be inserted, and is therefore expected to result in a document that is more in line with the user's intention. FIG. 2 is a flowchart of an image inserting processing in the first embodiment, which is executed in the general purpose computer 102 and the image generation server 101. The image inserting processing shown in FIG. 2 is an image inserting processing corresponding to the first method and the second method that have been described with reference to FIGS. 3A, 3B, 3C, 3D, and 3E. The processing on the general purpose computer 102 side (processes of steps S201 to S203, and S206) is executed by the CPU 170 loading the program stored in the ROM 172 into the RAM 171. In addition, the processing on the image generation server 101 side (processes of steps S204 and S205) is executed by the CPU 160 loading the program stored in the ROM 162 into the RAM 161.

The image inserting processing shown in FIG. 2 starts when the user selects the image generation button (not shown).

In the step S201, waiting for designating the position and the size (the region) of an image to be inserted into the document image by a user operation of the input device 175. Specifically, in the case of the first method, waiting for the user to designate the position and the size for inserting the AI image by inputting the position 300 (see FIG. 3A) into the document image and inputting the width and the height of the image into the window shown in FIG. 3B. In the case of the second method, waiting for the user to designate the region for inserting the AI image by inputting the vector 305 (see FIG. 3D) into the document image.

Although not shown in the flowchart of FIG. 2, in the case that an abnormally small size or region has been designated, as an error, the image inserting processing shown in FIG. 2 may be terminated. Furthermore, in the case that an abnormally large size or region has been designated, a warning asking whether or not to really execute the image generation even though the image generation will take a long time may be displayed on the display 176. When the user designates the position and the size (the region) of the image to be inserted into the document image, the image inserting processing shown in FIG. 2 proceeds to the step S202.

In the step S202, the window shown in FIG. 3B or FIG. 3D is displayed on the display 176, and waiting for the user to input a keyword of an image that the user wants to generate by operating the input device 175. When the user inputs the keyword into the window shown in FIG. 3B or FIG. 3D, the image inserting processing shown in FIG. 2 then proceeds to the step S203.

In the step S203, an AI image generation request including the size of the image to be generated inputted in the step S201 and information on the keyword of the image that the user wants to generate inputted in the step S202 is transmitted to the image generation server 101. After that, the image inserting processing shown in FIG. 2 proceeds to the step S204.

After that, the user may be able to continue performing document editing on the general purpose computer 102 until the image inserting processing shown in FIG. 2 proceeds to the step S206.

In the step S204, the image generation server 101 causes the GPU 166 to execute the image generation program 165 in response to the AI image generation request received from the general purpose computer 102 via the LAN 103, and generate an AI image. The AI image generation request includes the image size, the keyword, and the parameters required for the image generation such as the number of the rendering steps. In addition, in the case that the image generation is already being processed in the image generation server 101 due to another AI image generation request, the requests received earlier will be processed sequentially, and the processing of the relevant request will wait until its turn comes. After that, the image inserting processing shown in FIG. 2 proceeds to the step S205.

In the step S205, the image generation server 101 transmits image data of the AI image generated in the step S204 to the general purpose computer 102 via the LAN 103. After that, the image inserting processing shown in FIG. 2 proceeds to the step S206.

In the step S206, the AI image obtained from the image generation server 101 is inserted into the position designated in the step S201 on the document image, and the image inserting processing shown in FIG. 2 ends.

In the case that a plurality of images are generated in the step S204 in response to a single AI image generation request, a group of images (the plurality of images) generated in the step S206 may be presented to the user by means of the display 176, and the image selected by the user may be inserted.

As an example of another configuration, instead of inserting the image in the step S206, the generated image may be registered in a material image library of the document editing software. In the case of this configuration, it is not necessary to designate the position where the image is to be inserted in the step S201.

Furthermore, as an example of another configuration, the AI image generation may be performed within the general purpose computer 102, and a series of the processes may be completed within the general purpose computer 102 without using the image generation server 101.

Moreover, as an example of another configuration, in anticipation of the case where the user is not satisfied with the generated image, a regeneration button that allows the user to instruct the regeneration of the image without going through the window shown in FIG. 3B or FIG. 3E may be provided. In this case, the contents inputted in FIG. 3B or FIG. 3E, or the AI image generation request (hereinafter, referred to as "an initial request") is retained in the RAM 171 of the general purpose computer 102. As a result, in the case that the regeneration is instructed, it becomes possible to transmit an AI image generation request for regeneration to the image generation server 101 by using the contents that have been retained in the RAM 171.

However, it is not preferable to make other parameters used as the input data to the trained model 164, the keyword information, and the seed value that are included in the AI image generation request for regeneration the same as those in the initial request. This is because the AI image regenerated in response to such an AI image generation request for regeneration will essentially be the same as the image generated in response to the initial request. Therefore, in the AI image generation request for regeneration, the parameters other than the seed value (the keyword information, the number of the rendering steps, etc.) may be the same as those in the initial request, and the seed value may be set to a value different from that in the initial request.

It should be noted that in the case of regenerating an image with the above configuration, a relatively different image is likely to be generated each time because the seed value is changed to a value different from that in the initial request. For this reason, the above configuration is not suitable for the case where the user likes the image generated by the initial request to some extent but wishes to regenerate the image with only minor changes. Two methods for this case will be described below. One method is a method of performing the regeneration of the image based on an AI image already generated by the initial request (hereinafter, referred to as "an already-generated image"), which will be described below with reference to FIGS. 4A, 4B, 4C, and 5, and the other method is a method of fixing the seed value.

The method of fixing the seed value is a method of regenerating an image by an AI image generation request that includes the same seed value as that in the initial request but includes different keyword information. By using the same seed value, it is possible to generate similar images when performs the image generation and when performs the image regeneration, and the image regeneration is performed by changing the keyword according to the content that the user wants to change. In the case of this configuration, when the regeneration button is pressed, the window shown in FIG. 3B or FIG. 3E, into which the information of the initial request has already been inputted, is displayed, and when the user changes the keyword and selects the OK button, the image is regenerated.

The user may be allowed to select which of these regeneration methods is to be used to regenerate the image.

The method of performing the regeneration of the image based on an already-generated image will be described below.

In this method, the image generation based on an already-generated image (see FIG. 4A) is performed based on a designated keyword. Here, a case will be described in which the image 304 in the document image shown in FIG. 3C displayed on the display 176 is treated as an already-generated image 401 (see FIG. 4A), and an AI image is generated based on the already-generated image 401.

Figure 4A:
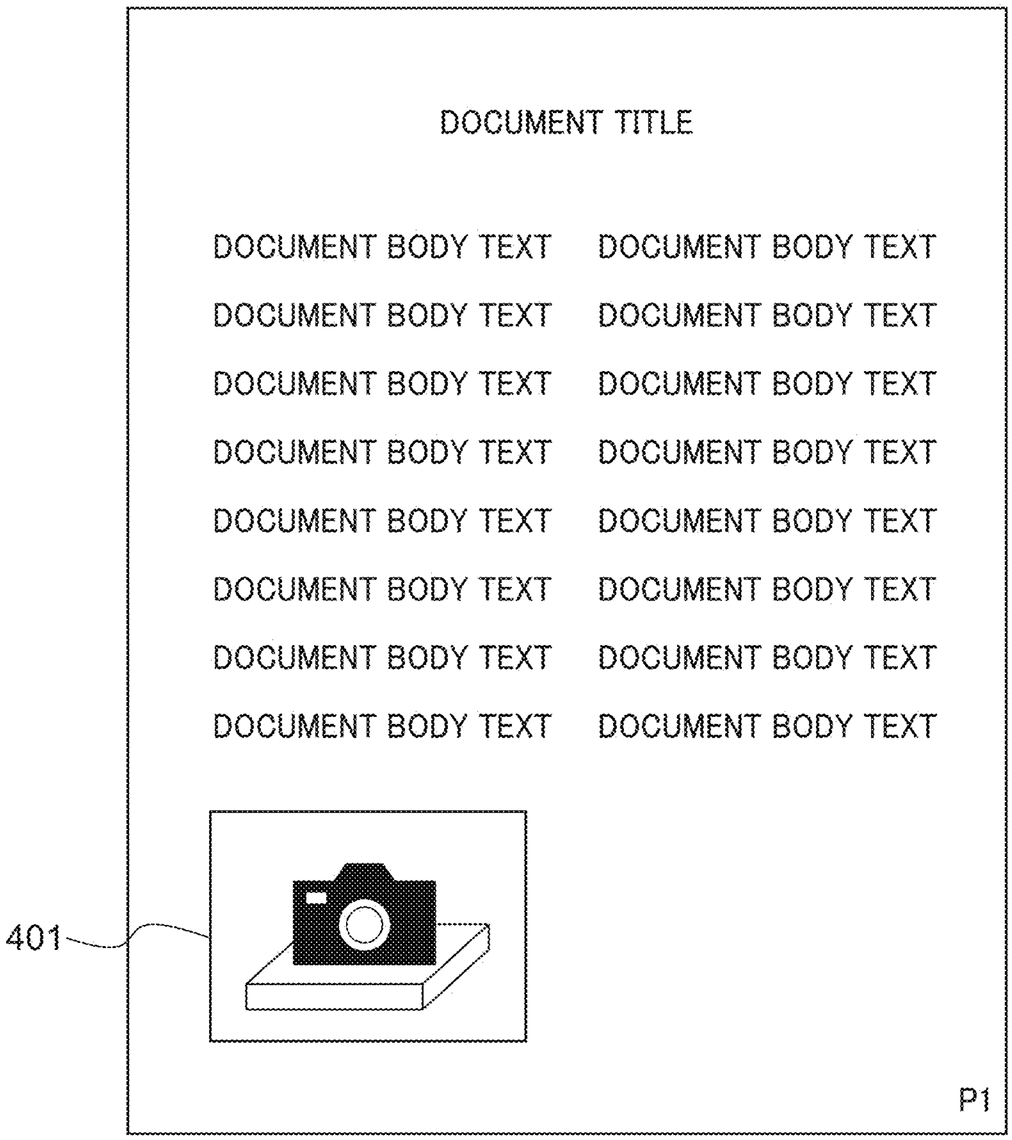
FIGS. 4A, 4B, and 4C are diagrams for explaining a specific example of a modification of the image inserting processing in the first embodiment of the present invention.

As shown in FIG. 4A, the document image includes information such as a title, a body text, a page number, and image data of the already-generated image 401. When the user right-clicks on the already-generated image 401 in the document image shown in FIG. 4A displayed on the display 176, a window (a redesignating UI) shown in FIG. 4B described below is displayed on the display 176.

Figure 4B:
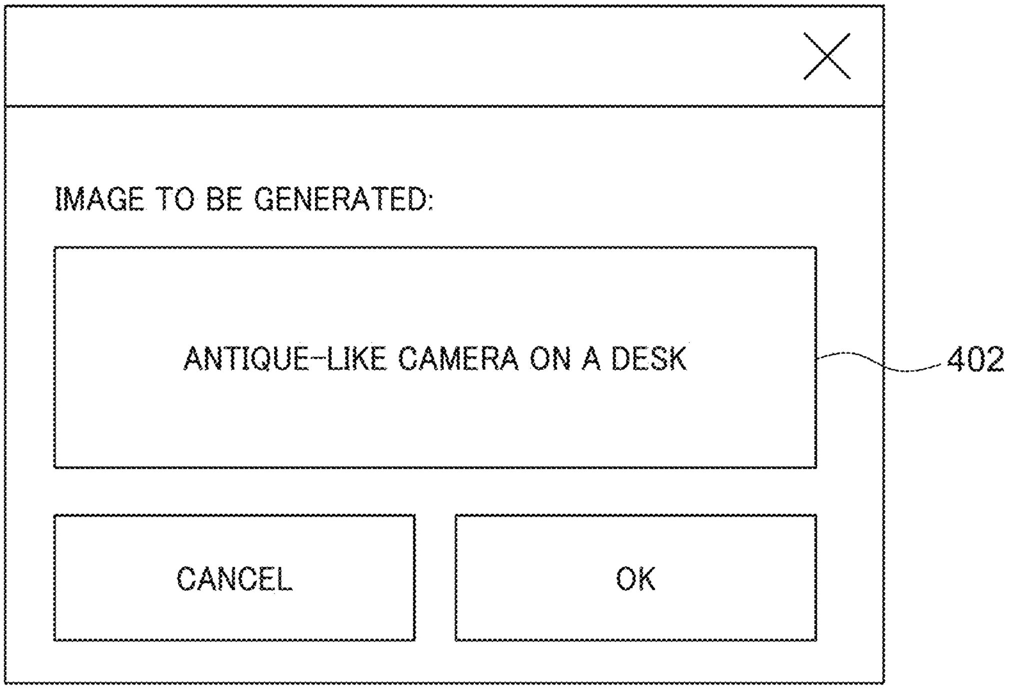

An item for the image generation may be provided in a menu (not shown) displayed on the display 176, and when the item for the image generation is selected, FIG. 4B may be displayed. Alternatively, the document editing software may display, on the display 176, a button that instructs the image generation based on the already-generated image, and when the user selects the button and then selects the already-generated image that becomes a base, FIG. 4B may be displayed.

FIG. 4B is a diagram that shows a window for designating information about an AI image to be generated based on the already-generated image 401. The user inputs a keyword 402 (a regeneration keyword: in this case, "antique-like camera on a desk") of an AI image that the user wants to generate into the window shown in FIG. 4B, and then selects an OK button (see FIG. 4B). In response to this, the CPU 170 transmits an AI image generation request including information such as information on the width and the height of the selected image, the keyword 402, and image data of the selected image to the image generation server 101 via the LAN 103. The GPU 166 performs the image generation based on the AI image generation request transmitted from the general purpose computer 102. Thereafter, the CPU 160 transmits the image generated by the image generation server 101 to the general purpose computer 102 via the LAN 103. The CPU 170 replaces the data of the already-generated image that has become a base with the image transmitted from the image generation server 101.

It should be noted that rather than replacing the already-generated image with an image newly generated based on the already-generated image, the image newly generated may be inserted so as to be superimposed on the already-generated image, or the image newly generated may be registered in the material image library of the document editing software.

Since the technique for generating an AI image based on a specific image is publicly known, a detailed description thereof will be omitted.

It should be noted that in this way, in the case of using the method of performing the regeneration of the image based on the already-generated image, as a parameter required for the AI image generation, it is necessary to include in the AI image generation request how much consideration should be given to the already-generated image that becomes a base. This value may be a fixed value, or this value may be settable by the document editing software and may be a value set in advance by the user, or this value may be designated by the user on the window shown in FIG. 4B.

Figure 4C:
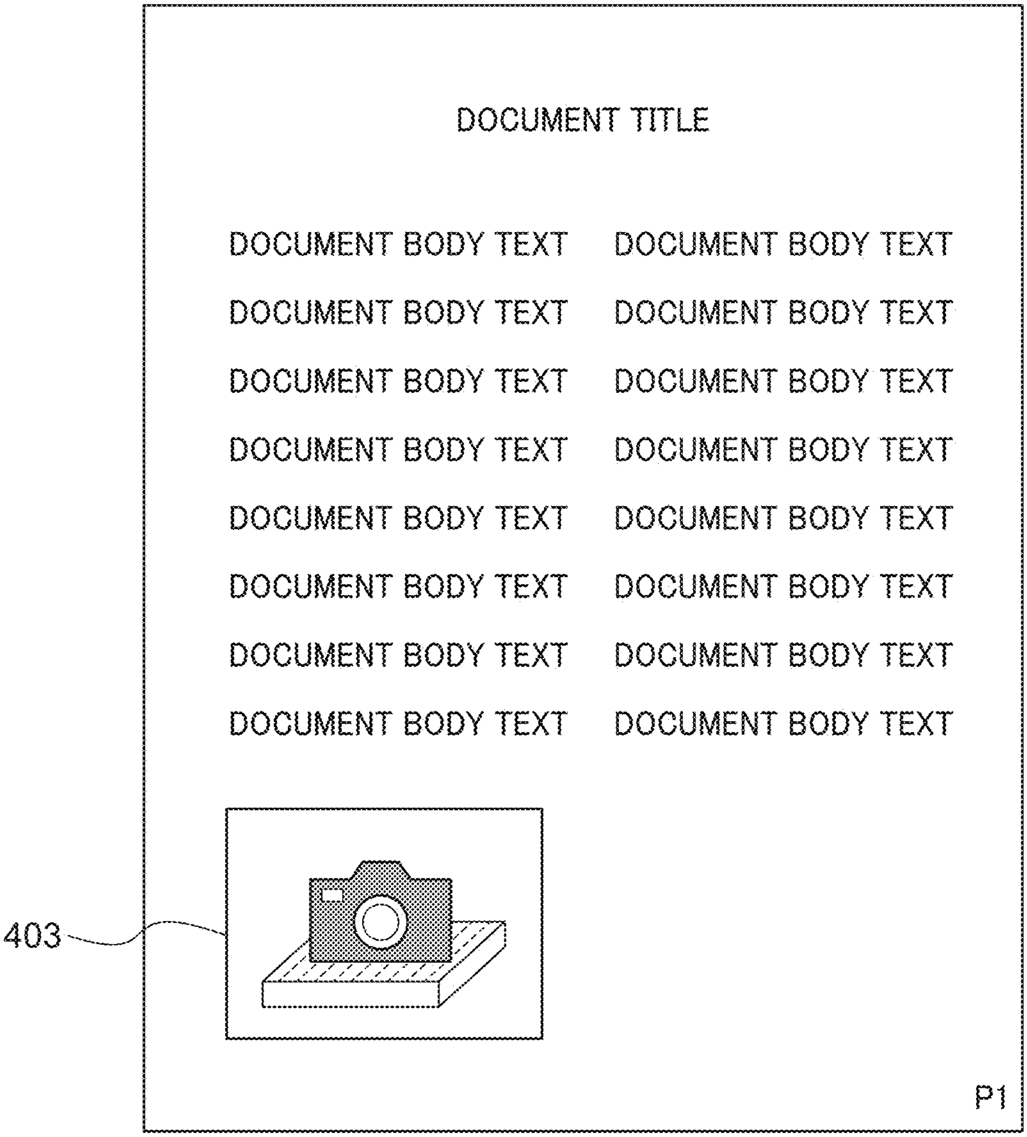

FIG. 4C is a diagram that shows a document image in the case that the already-generated image 401 in the document image shown in FIG. 4A has been replaced with a preview image of the AI image received from the image generation server 101. When the document editing software obtains the AI image from the image generation server 101, the document image shown in FIG. 4C is displayed by the document editing software updating the document image shown in FIG. 4A on the screen of the display 176.

As shown in FIG. 4C, a preview image 403 of the AI image generated by the image generation server 101 has been placed in the region where the already-generated image 401 in the document image shown in FIG. 4A is originally located.

In the case that the user is not satisfied with the preview image 403 in the document image shown in FIG. 4C, a button that allows the user to issue an again-regeneration instruction without going through the window display of FIG. 4B may be provided. The image data included in the AI image generation request generated by the CPU 170 in response to the again-regeneration instruction may be the image data of the already-generated image 401 or the image data of the preview image 403.

Furthermore, the AI image that is the basis for the preview image 403 does not have to be inserted in advance into the document like the already-generated image 401 shown in FIG. 4A, but may be configured so that the user designates it from image data that is capable of being referenced by the general purpose computer 102. In the case of this configuration, it is necessary to separately display the document image shown in FIG. 3A or the document image shown in FIG. 3D on the display 176 by the document editing software, and to instruct the position and the size (or the region) for inserting the AI image into the document.

Figure 5:
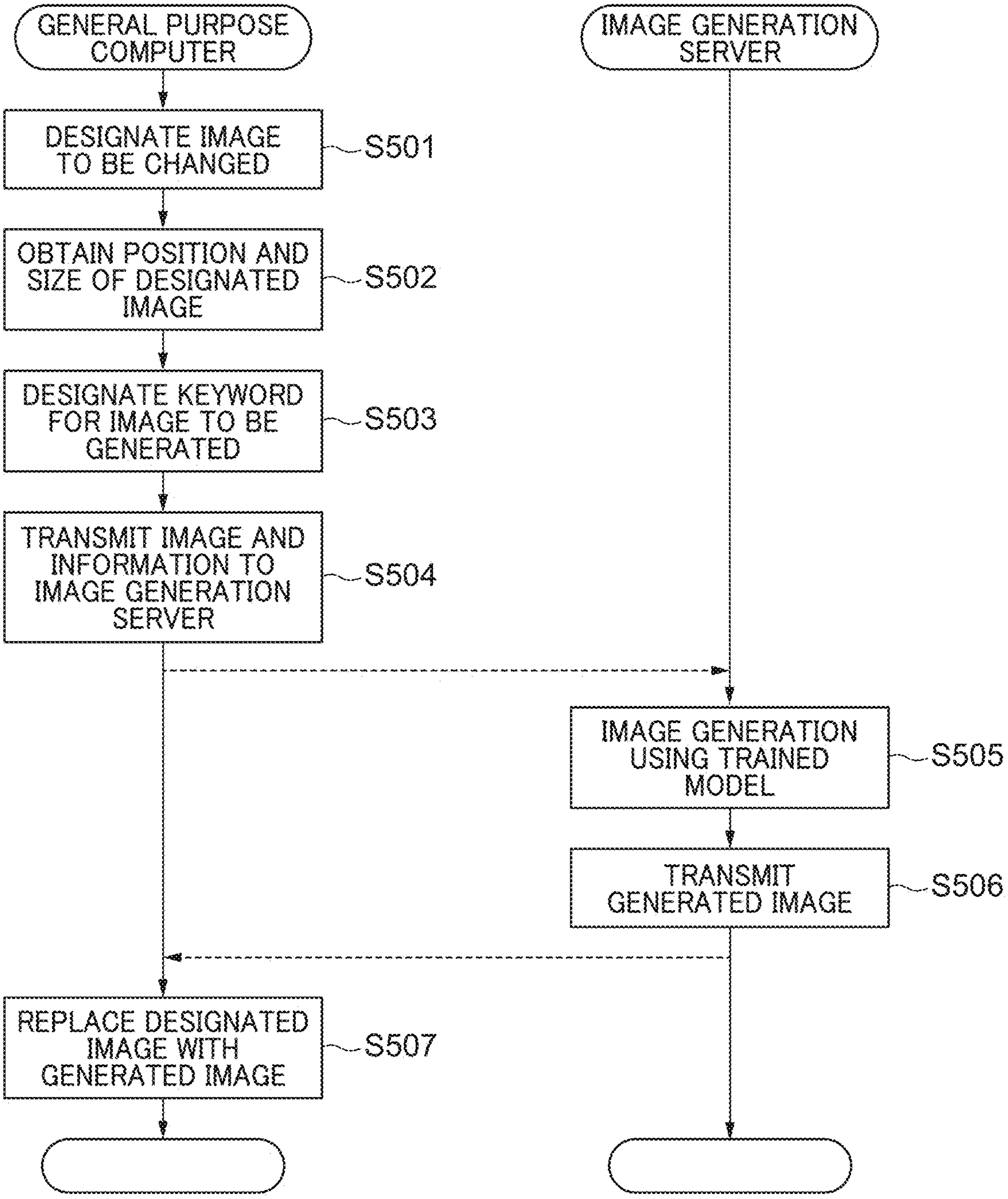
FIG. 5 is a flowchart of the modification of the image inserting processing in the first embodiment, which is executed in the general purpose computer and the image generation server.

FIG. 5 is a flowchart of a modification of the image inserting processing in the first embodiment, which is executed in the general purpose computer 102 and the image generation server 101. The image inserting processing shown in FIG. 5 is an image inserting processing corresponding to the method of performing the regeneration of the image based on an already-generated image that has been described with reference to FIGS. 4A, 4B, and 4C. The processing on the general purpose computer 102 side (processes of steps S501 to S504, and S507) is executed by the CPU 170 loading the program stored in the ROM 172 into the RAM 171. In addition, the processing on the image generation server 101 side (processes of steps S505 and S506) is executed by the CPU 160 loading the program stored in the ROM 162 into the RAM 161.

In the step S501, waiting for designating the already-generated image that the user wants to use as the basis for the image generation (in the first embodiment, the already-generated image 401 shown in FIG. 4A) from the document image being displayed on the display 176 by a user operation of the input device 175. When the user designates the already-generated image, the image inserting processing shown in FIG. 5 proceeds to the step S502.

In the step S502, the position in the document of the already-generated image 401 designated in the step S501, and information on the width and the height of the image are obtained. After that, the image inserting processing shown in FIG. 5 proceeds to the step S503.

In the step S503, the window shown in FIG. 4B is displayed on the display 176, and waiting for the user to input a keyword of an image that the user wants to generate on the document editing software by operating the input device 175. When the user inputs the keyword into the window shown in FIG. 4B, the image inserting processing shown in FIG. 5 then proceeds to the step S504.

In the step S504, an AI image generation request including the information on the width and the height of the image obtained in the step S502, the keyword inputted in the step S503, and the image data of the already-generated image 401 designated in the step S501 is transmitted to the image generation server 101. After that, the image inserting processing shown in FIG. 5 proceeds to the step S505.

After that, the user may be able to continue performing document editing on the general purpose computer 102 until the image inserting processing shown in FIG. 5 proceeds to the step S507.

In the step S505, the image generation server 101 causes the GPU 166 to execute the image generation program 165 in response to the AI image generation request received from the general purpose computer 102 via the LAN 103, and generate an AI image. In addition, in the case that the image generation is already being processed in the image generation server 101 due to another AI image generation request, the requests received earlier will be processed sequentially, and the processing of the relevant request will wait until its turn comes. After that, the image inserting processing shown in FIG. 5 proceeds to the step S506.

In the step S506, the image generation server 101 transmits image data of the image generated in the step S505 to the general purpose computer 102 via the LAN 103. After that, the image inserting processing shown in FIG. 5 proceeds to the step S507.

In the step S507, the already-generated image 401 designated in the step S501 is replaced with the image of the image data received from the image generation server 101, the document image after the replacement (see FIG. 4C) is displayed on the display 176, and the image inserting processing shown in FIG. 5 ends.

By the above procedures, in the first embodiment, by means of the general purpose computer 102, the user simply performs designating the position and the size of the image to be inserted into the document and inputting the keyword of the image that the user wants to generate, the image desired by the user is inserted into the region desired by the user at the optimal resolution. As a result, it is possible to reduce the user's labor in editing documents on the general purpose computer 102 and to utilize a more suitable image.

Next, the second embodiment of the present invention will be described. In the first embodiment, by means of the general purpose computer 102, the user has performed designating the position and the size of the image to be inserted into the document and inputting the keyword of the image that the user wants to generate. On the other hand, in the second embodiment, by means of the image forming apparatus 100, the user performs designating the position and the size of the image to be inserted into the document and inputting the keyword of the image that the user wants to generate. The second embodiment will be described below, focusing on the differences from the first embodiment. It should be noted that in the second embodiment, the same components as those in the first embodiment are denoted by the same reference numerals, and the descriptions thereof will be omitted.

Figure 6:
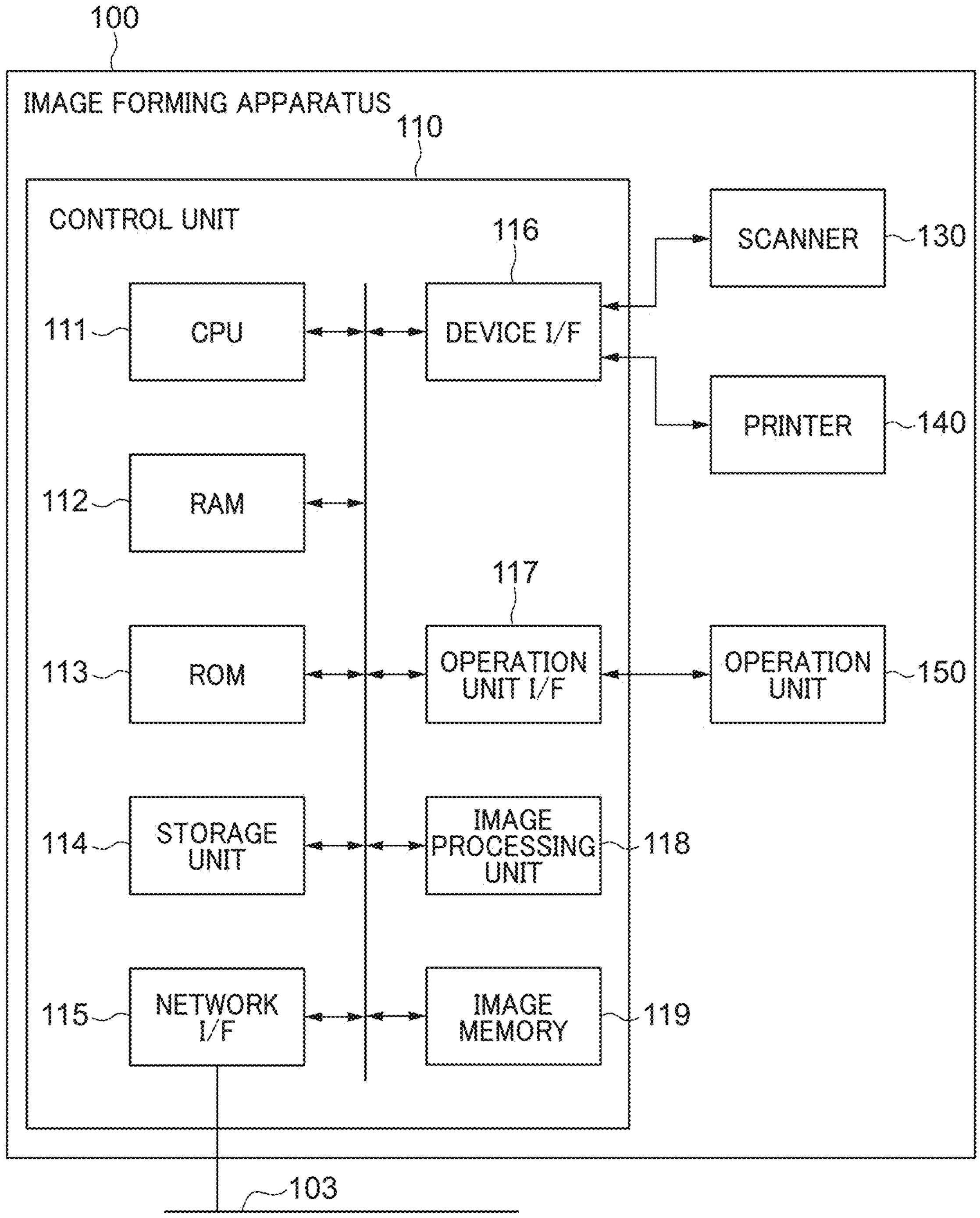
FIG. 6 is a block diagram that shows a hardware configuration of an image forming apparatus as an information processing apparatus according to a second embodiment of the present invention.

FIG. 6 is a block diagram that shows a hardware configuration of the image forming apparatus 100.

The image forming apparatus 100 includes a control unit 110, a scanner 130, a printer 140, and an operation unit 150.

The control unit 110 includes a CPU 111, a RAM 112, a ROM 113, a storage unit 114, a device I/F 116, an operation unit I/F 117, an image processing unit 118, and an image memory 119.

The control unit 110 is connected to the scanner 130 which is an image input device and the printer 140 which is an image output device, and controls the input and output of image information. The control unit 110 is also connected to the LAN 103, and performs receiving print jobs, receiving images generated by the image generation server 101, and the like via the LAN 103.

The CPU 111 controls the operations of the image forming apparatus 100, and operates based on a program stored in the RAM 112. The ROM 113 is a boot ROM, and stores a boot program for an OS that runs the image forming apparatus 100.

The storage unit 114 is a non-volatile device such as an HDD or an SSD, and stores system software, the image data, programs for controlling the operations of the general purpose computer 102, etc. The program stored in the storage unit 114 is loaded into the RAM 112, and the CPU 111 controls the image forming apparatus 100 based on this program.

The network I/F 115 is connected to the LAN 103 and controls input and output of various kinds of information via the network. The device I/F 116 connects the control unit 110 to the scanner 130 which is the image input device and the printer 140 which is the image output device, and performs synchronous/asynchronous conversion of the image data.

The operation unit I/F 117 is an interface that connects the operation unit 150 and the control unit 110, and outputs, to the operation unit 150, image data to be displayed on the operation unit 150. In addition, the operation unit I/F 117 transmits, to the CPU 111, information inputted by the user from the operation unit 150. In the second embodiment, the case that the operation unit 150 is a touch panel display will be described as an example, but the operation unit 150 is not limited to a touch panel display as long as it includes a display unit for displaying output from the control unit 110 and an accepting unit for accepting input from the user. For example, the operation unit 150 may be configured such that the display unit and the accepting unit are separate units.

The image processing unit 118 performs image processing with respect to print data received via the LAN 103, and also performs image processing with respect to image data inputted and outputted into and from the device I/F 116. The image memory 119 is a memory for temporarily storing image data to be processed by the image processing unit 118.

Figure 7:
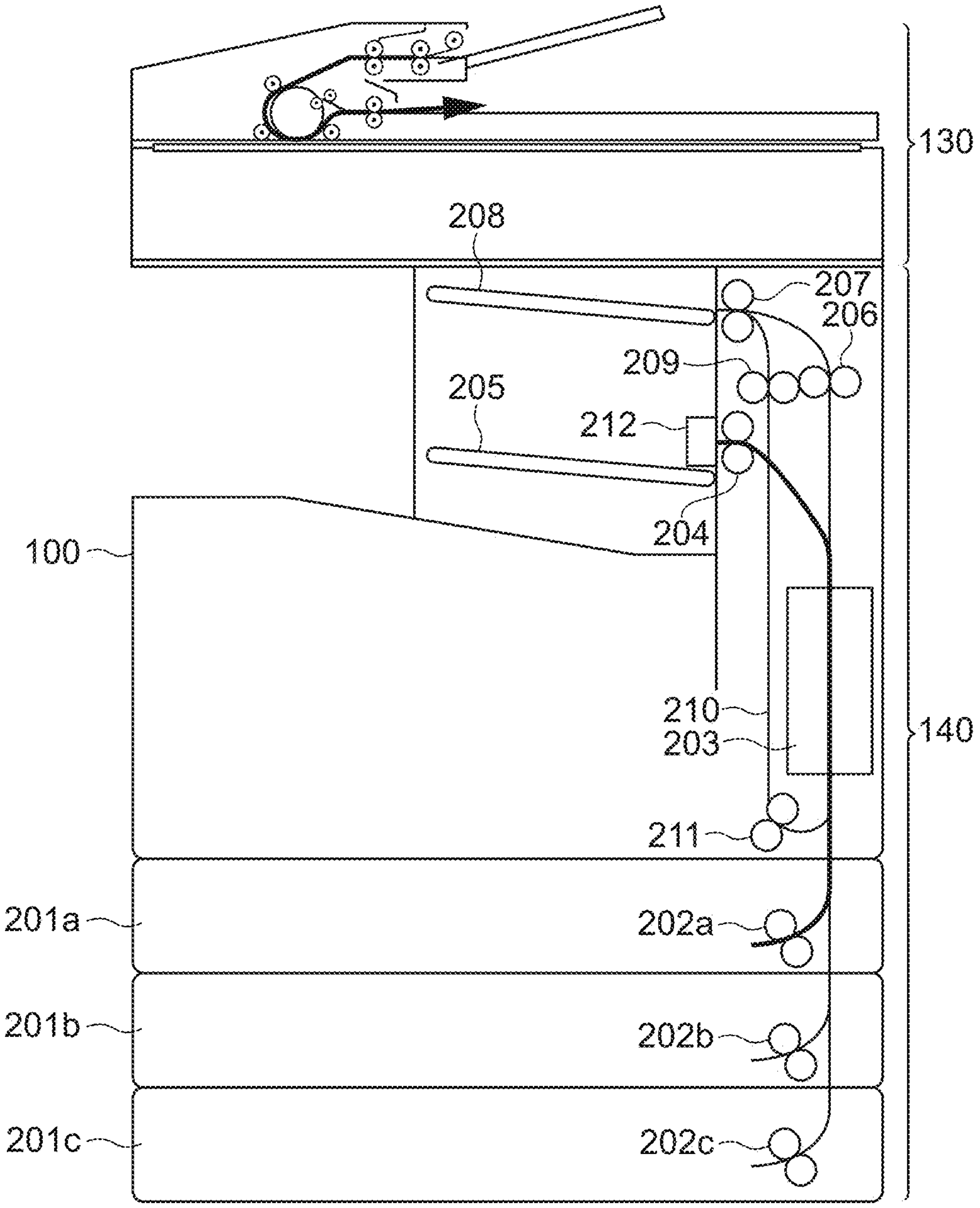
FIG. 7 is a cross-sectional view of the image forming apparatus shown in FIG. 6.

FIG. 7 is a cross-sectional view of the image forming apparatus 100 in the second embodiment.

As shown in FIG. 7, in the image forming apparatus 100, the scanner 130 is disposed above the printer 140.

The printer 140 includes sheet feeding cassettes 201*a*, 201*b*, and 201*c*, conveying rollers 202*a*, 202*b*, and 202*c*, a printing unit 203, conveying rollers 204, 209, and 211, sheet discharging trays 205 and 208, feeding rollers 206 and 207, a conveying path for double-sided printing (a double-sided printing conveying path) 210, and a stapling device 212.

Each of the sheet feeding cassettes 201*a*, 201*b*, and 201*c* stores sheets (printing sheets). It should be noted that although the image forming apparatus 100 includes the three sheet feeding cassettes 201*a*, 201*b*, and 201*c*, the number of the sheet feeding cassettes is not limited to three.

The conveying rollers 202*a*, 202*b*, and 202*c* feed the sheets stored in the corresponding sheet feeding cassettes 201*a*, 201*b*, and 201*c* to the printing unit 203, respectively. The printing unit 203 prints an image on the fed sheet. The printing unit 203 may employ an inkjet method in which an image is printed by spraying ink onto the sheet, or may employ an electrophotographic method in which an image is printed by fixing toner onto the sheet. The sheet that has been printed by the printing unit 203 is discharged onto the sheet discharging tray 205 via the conveying roller 204.

In the case of double-sided printing, the sheet, the front side of which has been printed by the printing unit 203, is conveyed once to the sheet discharging tray 208 via the feeding rollers 206 and 207 instead of the conveying roller 204, and then conveyed to the double-sided printing conveying path 210 by the reversely rotated feeding roller 207 and the conveying roller 209. Next, the sheet is conveyed to the conveying roller 211 and fed again to the printing unit 203. Thereafter, the sheet, the back side of which has been printed by the printing unit 203, is discharged onto the sheet discharging tray 205 via the conveying roller 204.

The stapling device 212 is capable of stapling the sheets outputted to the sheet discharging tray 205.

Next, in the second embodiment, a method by which a user is able to insert a material image, which is an AI image, into a document will be described with reference to FIGS. 8A, 8B, 8C, and 8D.

Figure 8A:
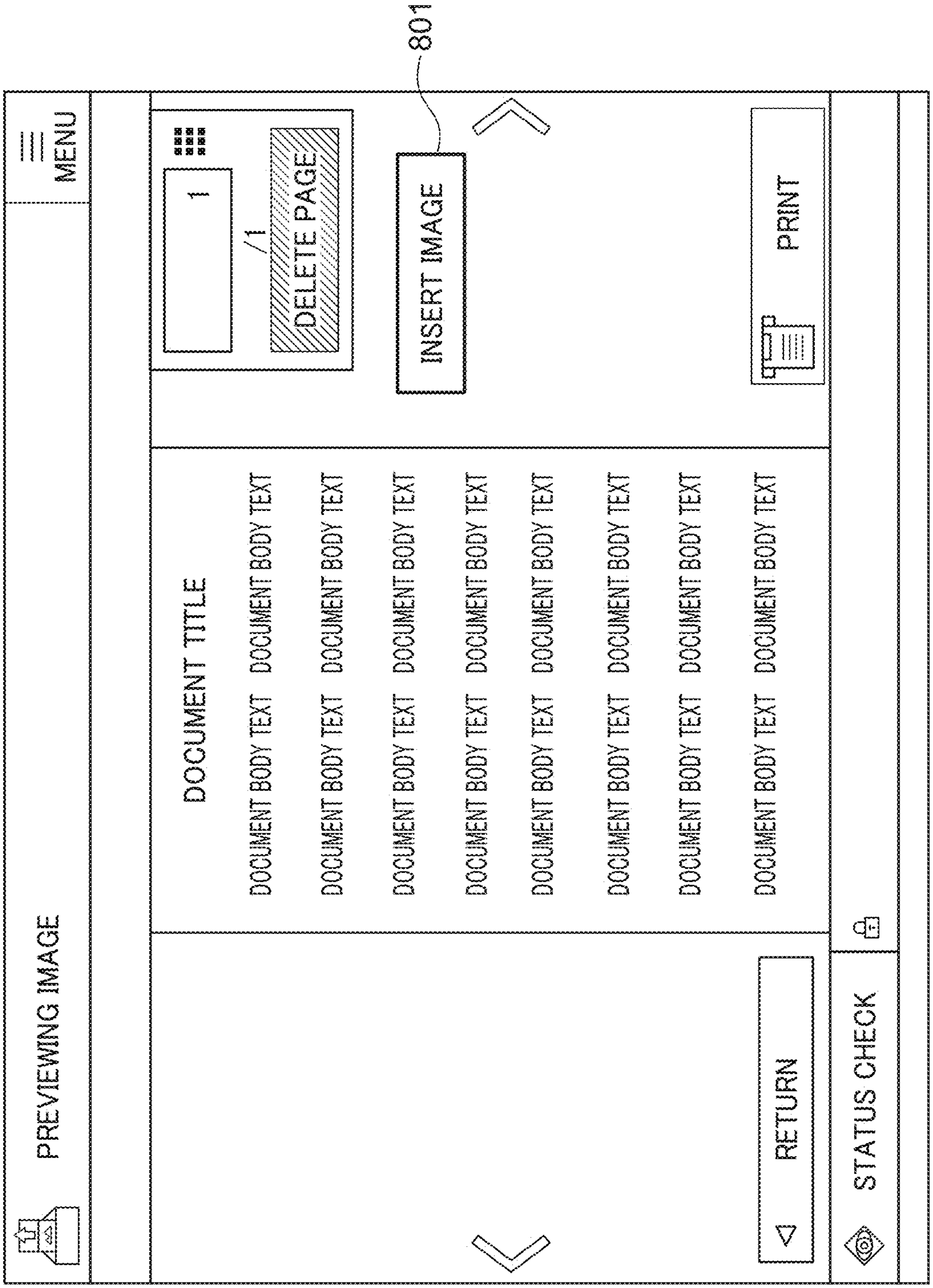
FIG. 8A is a diagram that shows a preview display screen displayed on an operation unit of the image forming apparatus.

FIG. 8A is a diagram that shows a preview display screen displayed on the operation unit 150.

As shown in FIG. 8A, on the preview display screen, a document into which the user wants to insert an AI image is displayed as a preview image 800, and a button 801 for shifting to a mode for inserting an image into the document is provided. It should be noted that the document into which the user wants to insert the AI image is obtained by the CPU 111 (an image obtaining unit) in response to the user's operation on the operation unit 150. Specifically, the CPU 111 obtains data on one of an original image that has been read by the scanner 130 (a reading unit), an image obtained by performing RIP processing of PDL data received via the LAN 103, and a document image previously stored in the storage unit 114.

The preview image 800 is an image generated based on the data of the document into which the user wants to insert the AI image, which is obtained by the CPU 111. When the button 801 is selected by the user, shifting to the mode for inserting an image into the document, and the screen displayed on the operation unit 150 transitions from the preview display screen shown in FIG. 8A to an image insertion position designating screen shown in FIG. 8B.

Figure 8B:
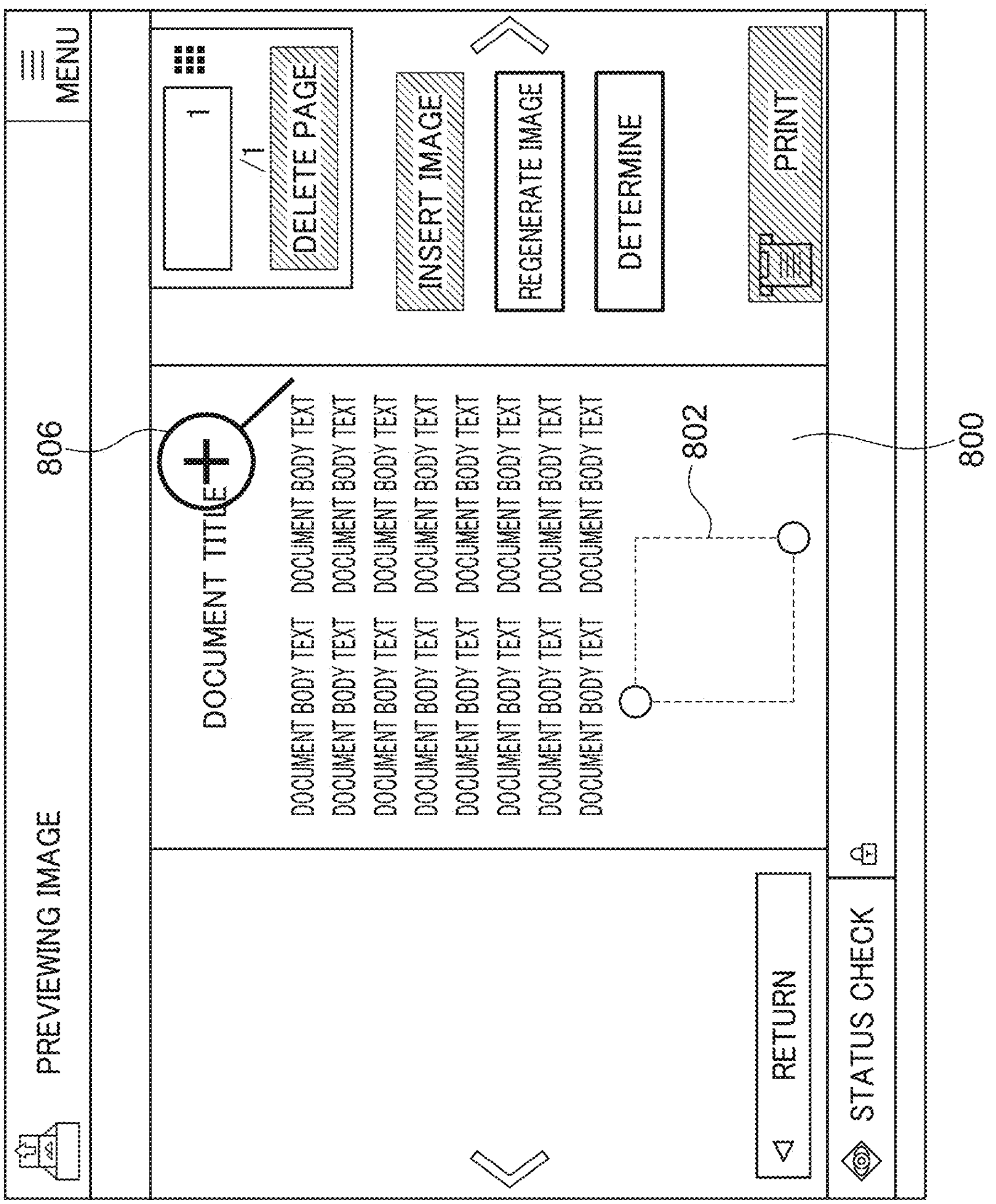
FIG. 8B is a diagram that shows an image insertion position designating screen displayed on the operation unit.

FIG. 8B is a diagram that shows the image insertion position designating screen displayed on the operation unit 150.

As shown in FIG. 8B, the image insertion position designating screen is a screen for designating into which region of the document to be printed the AI image generated by the image generation server 101 should be inserted.

The user touches two points on the preview image 800 via the operation unit 150 to designate a region 802 into which the user wants to insert an image. At this time, in the region 802, the two touched points are displayed by white circles and the region 802 itself is displayed by a dotted line so that the region designated by the user's operation can be easily identified.

Furthermore, as shown in FIG. 8B, the image insertion position designating screen may further include an enlarged display button 806. The enlarged display button 806 is a button whose position within the preview image 800 is capable of being moved by a dragging operation performed by the user, and an enlarged display of a part of the preview image 800 near the enlarged display button 806 is performed when the user performs a tapping operation of the enlarged display button 806. This enlarged display allows the user to easily perform the touch operation of the above two points. This enlarged display button 806 may be provided on the screen that displays the document images shown in FIG. 3A and FIG. 3D in the first embodiment on the display 176.

In addition, a margin part in the preview image 800 may be recognized, and the region 802 may be displayed in the margin part so that the size and the position of the region 802 are capable of being changed by the user. As a result, even in the case that the screen size of the operation unit 150 (the touch panel display) is small, the user is able to easily perform designating the region 802.

Figure 8C:
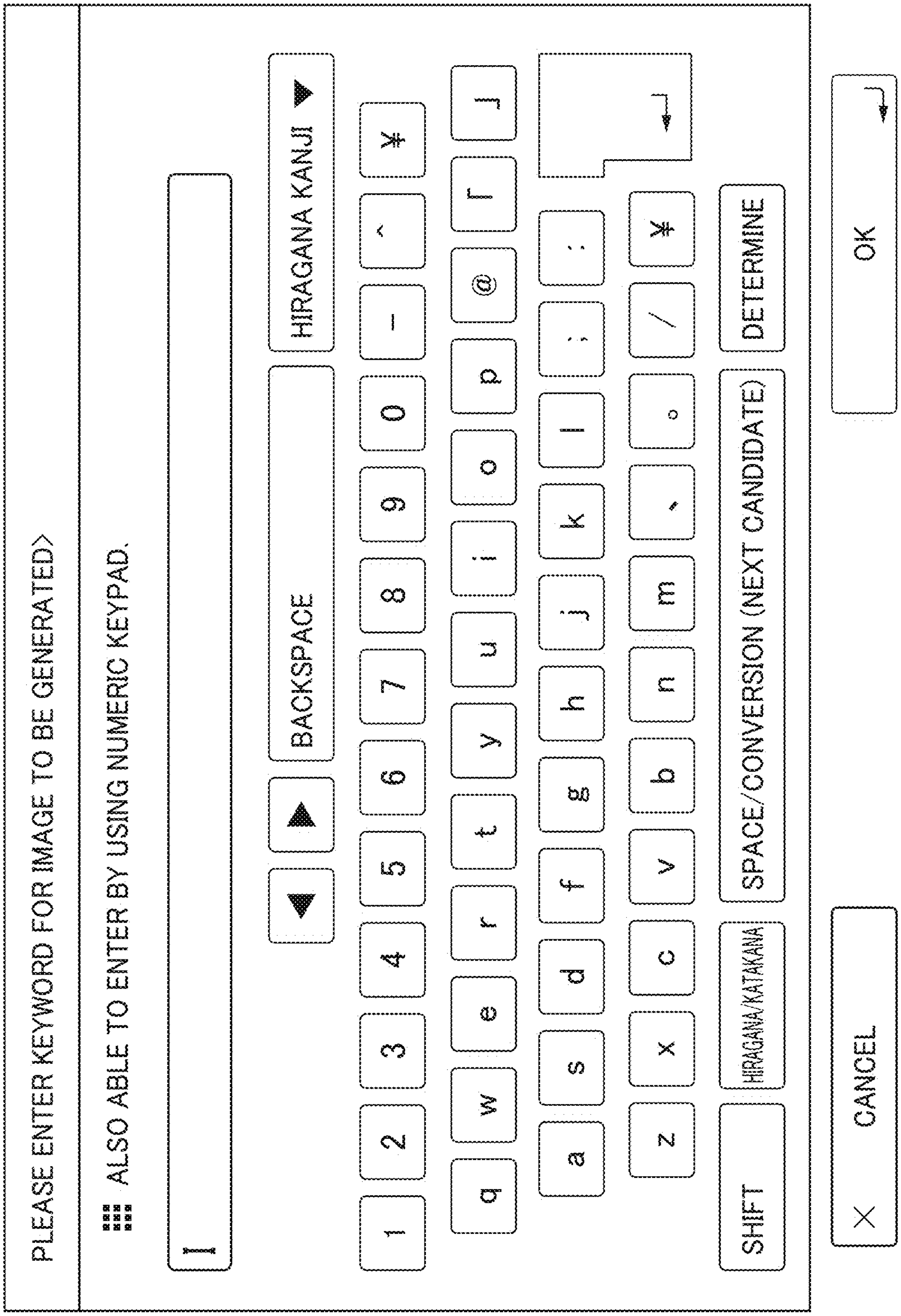
FIG. 8C is a diagram that shows a keyword input screen displayed on the operation unit.

When the region 802 is designated by the user's operation, the screen displayed on the operation unit 150 transitions from the image insertion position designating screen shown in FIG. 8B to a keyword input screen shown in FIG. 8C.

FIG. 8C is a diagram that shows the keyword input screen displayed on the operation unit 150.

As shown in FIG. 8C, the keyword input screen is a screen for the user to input a keyword of the image that the user wants to generate as the image to be inserted into the document.

When the user inputs a keyword by using a software keyboard located at the bottom of the keyword input screen or a numeric keypad (not shown) and then selects an OK button (see FIG. 8C), the CPU 111 (the AI image obtaining unit) starts obtaining an AI image. Specifically, the CPU 111 generates an AI image generation request including information on the width and the height of the region 802 (see FIG. 8B) and the inputted keyword (see FIG. 8C) and transmits it to the image generation server 101 via the LAN 103. At this time, the data of the transmitted AI image generation request itself, or the information included in the request, is stored in the RAM 112.

In the image generation server 101, the GPU 166 generates an AI image based on the AI image generation request transmitted from the image forming apparatus 100. When the generation of the AI image is completed, the CPU 160 transmits the generated AI image to the image forming apparatus 100.

It should be noted that as described above, the user may designate the region 802 after changing a display magnification of the preview image 800 by using the enlarged display button 806 (see FIG. 8B). However, in this case, information on the width and the height that have been converted to the size of the region 802 at an original magnification is included in the AI image generation request.

Figure 8D:
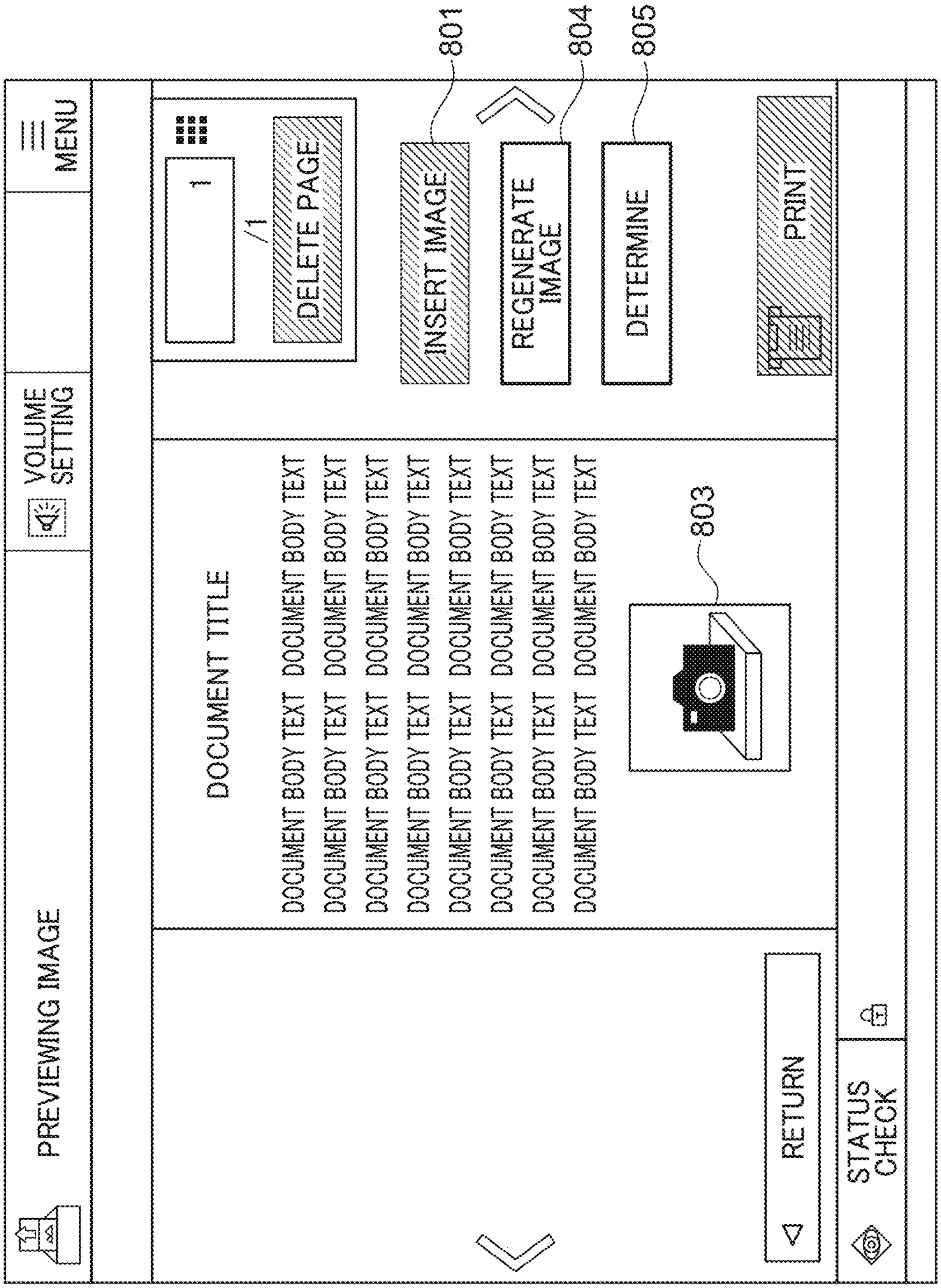
FIG. 8D is a diagram that shows a preview display screen that displays a preview of a document image after an AI image is inserted into a document.

FIG. 8D is a diagram that shows a preview display screen that displays a preview of a document image after an AI image is inserted into a document. An image 803 generated for preview display based on the AI image received from the image generation server 101 is displayed in the region 802. In the second embodiment, the image 803 may be displayed on the preview display screen shown in FIG. 8D after being composited with the preview image 800, or may be displayed so as to be superimposed on the preview image 800. The preview display screen shown in FIG. 8D is displayed by the CPU 111 on the screen of the operation unit 150 when the AI image is transmitted from the image generation server 101 to the image forming apparatus 100.

As a result, it is possible to insert the material image (the AI image) with a desired size at a designated position in the document.

The preview display screen shown in FIG. 8D further includes a button 804 for instructing to regenerate the AI image in the case that the user is not satisfied with the image 803.

When the button 804 is selected by the user, the CPU 111 starts obtaining the regenerated AI image. Specifically, first, the CPU 111 retrieves the information such as the width and the height of the region 802 and the keyword inputted on the keyword input screen shown in FIG. 8C from the RAM 112, and generates an AI image generation request based on these pieces of information. It should be noted that in the case that the data of the AI image generation request, which is the initial request, has been retained in the RAM 112, the data of the AI image generation request, which is the initial request, may be read out. Next, the CPU 111 transmits the AI image generation request that has been generated (or has been read out) to the image generation server 101, causing the image generation server 101 to generate an AI image again. Then, the CPU 111 updates the image 803 with an image generated for preview display based on the AI image received from the image generation server 101. This procedure may be repeated any number of times.

On the preview display screen shown in FIG. 8D, in the case that the user is satisfied with the image 803, he or she selects a button 805, and the image data of the original image of the image 803 is composited with the region 802 in the image data of the original image of the preview image 800, and the obtained composite image is stored in the storage unit 114. It should be noted that in order to preserve the image data of the original image of the preview image 800, a composite image may be obtained by compositing a copy of the image data of the original image of the preview image 800 with the image data of the original image of the image 803. When the button 805 is selected by the user, the button 801, which is highlighted in FIG. 8D, becomes selectable by the user. Therefore, the user may then select the button 801 to further attempt to insert the AI image into the document image, or may then select a return button (see FIG. 8D) to end the preview display on the operation unit 150.

Even in the case that the preview image 800 and the image 803 are stored in the RAM 112, the preview image 800 and the image 803 may be stored in the image memory 119.

It should be noted that in the case that the user selects the return button before selecting the button 805 and cancels the preview display on the operation unit 150, no changes are made to the image data of the document image previewed in FIG. 8A.

Figure 9:
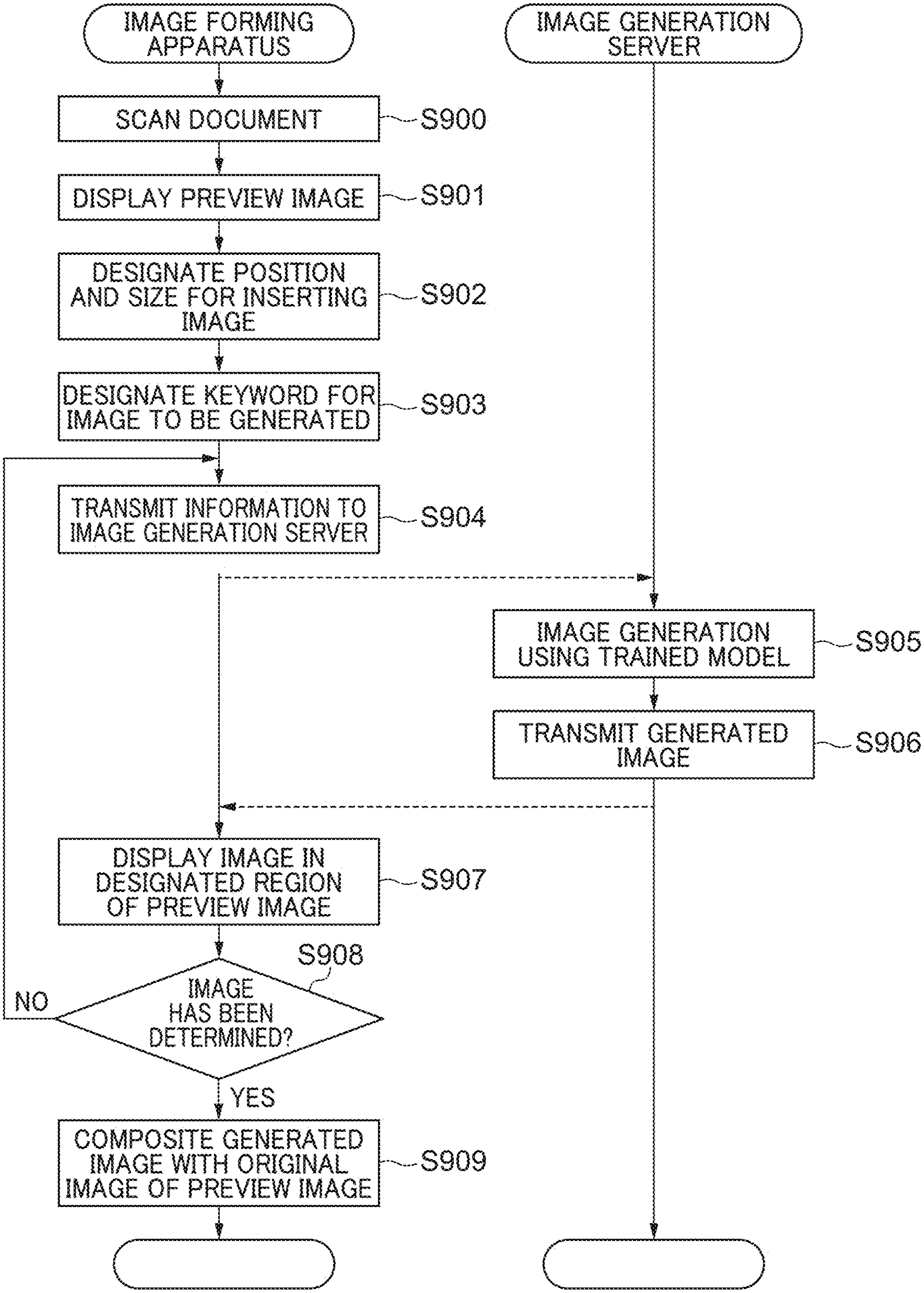
FIG. 9 is a flowchart of an image inserting processing in the second embodiment, which is executed in the image forming apparatus and the image generation server.

FIG. 9 is a flowchart of an image inserting processing in the second embodiment, which is executed in the image forming apparatus 100 and the image generation server 101. The processing on the image forming apparatus 100 side (processes of steps S900 to S904, and S907 to S909) is executed by the CPU 111 loading the program stored in the ROM 113 into the RAM 112. In addition, the processing on the image generation server 101 side (processes of steps S905 and S906) is executed by the CPU 160 loading the program stored in the ROM 162 into the RAM 161.

In the step S900, the document (an original) into which the user wants to insert the AI image is placed on a document placing platen (not shown) of the scanner 130, and waiting for the user to issue a scanning instruction to scan the original image by the scanner 130. When placing the document on the document placing platen is detected and the user issues the scanning instruction to scan the original image, scanning of the original image is performed by the scanner 130, and the obtained document image is stored as a BOX document in the storage unit 114, and the image inserting processing shown in FIG. 9 proceeds to the step S901.

In the step S901, the document image stored in the storage unit 114 in the step S900 is loaded into the RAM 112 or the image memory 119, and the preview image 800 is generated based on the document image and is displayed on the operation unit 150. Thereafter, waiting for the user to issue an instruction to generate an image, that is, waiting for the user to select the button 801. Since the generation of the preview image 800 is a publicly-known technique, details thereof will be omitted. When the user issues the instruction to generate an image, the image inserting processing shown in FIG. 9 proceeds to the step S902.

In the step S902, the preview screen of FIG. 8B is displayed on the operation unit 150, and waiting for the user to designate the position and the size at which the AI image is to be inserted on the preview screen (in the second embodiment, waiting for the user to designate the region 802). When the user designates the region 802, the image inserting processing shown in FIG. 9 proceeds to the step S903.

In the step S903, the keyword input screen shown in FIG. 8C is displayed on the operation unit 150, and waiting for the user to input a keyword of an image that the user wants to generate as the AI image to be inserted. When the user inputs the keyword, the image inserting processing shown in FIG. 9 proceeds to the step S904.

In the step S904, an AI image generation request including the width and the height of the region 802 that have been designated in the step S902 and information on the keyword of the image that the user wants to generate as the AI image to be inserted that has been inputted in the step S903 is transmitted to the image generation server 101. After that, the image inserting processing shown in FIG. 9 proceeds to the step S905.

After that, the user may be able to continue performing document editing on the general purpose computer 102 until the image inserting processing shown in FIG. 9 proceeds to the step S907.

In the step S905, the image generation server 101 causes the GPU 166 to execute the image generation program 165 in response to the AI image generation request received from the image forming apparatus 100 via the LAN 103, and generate an AI image. In addition, in the case that the image generation is already being processed in the image generation server 101 due to another AI image generation request, the requests received earlier will be processed sequentially, and the processing of the relevant request will wait until its turn comes. After that, the image inserting processing shown in FIG. 9 proceeds to the step S906.

In the step S906, the image generation server 101 transmits image data generated in the step S905 to the image forming apparatus 100 via the LAN 103. After that, the image inserting processing shown in FIG. 9 proceeds to the step S907.

In the step S907, the image forming apparatus 100 generates the image 803 for preview display based on the image data received from the image generation server 101, and displays the image 803 by compositing or superimposing it on the region 802 designated in the step S902 in the preview image displayed in the step S901. After that, the image inserting processing shown in FIG. 9 proceeds to the step S908.

In the step S908, the image forming apparatus 100 determines whether or not the AI image to be inserted into the document has been determined.

Specifically, in the case that the user selects the button 804 on the operation unit 150, in order to regenerate the AI image to be inserted into the document (NO in the step S908), the image inserting processing shown in FIG. 9 proceeds to the step S904, and causing the image generation server 101 to perform the generation of the AI image again. On the other hand, in the case that the user selects the button 805 on the operation unit 150, since the AI image to be inserted into the document has been determined (YES in the step S908), the image inserting processing shown in FIG. 9 proceeds to the step S909.

In the step S909, the image forming apparatus 100 composites the AI image determined in the step S908 in the region 802 designated in the step S902 with the original image of the preview image 800 generated in the step S901, and stores it in the storage unit 114. After that, the image inserting processing shown in FIG. 9 ends.

In the second embodiment, in the case of regenerating an AI image, as in the first embodiment, a specific image in the document may be designated, and the image generation may be performed based on image data thereof. In this case, image data obtained by cutting out the image of the region 802 designated in the image forming apparatus 100 is used.

It should be noted that the various configurations described in the first embodiment are also applicable to the second embodiment.

By the above procedures, in the second embodiment, by means of the image forming apparatus 100, the user simply performs designating the position and the size of the image to be inserted into the document and inputting the keyword of the image that the user wants to generate, the image desired by the user is inserted into the region in the document desired by the user at the optimal resolution. As a result, it is possible to reduce the user's labor in editing documents on the image forming apparatus 100 and to utilize a more suitable image.

Next, a third embodiment of the present invention will be described. In the first embodiment and the second embodiment, the user has performed designating the position and the size of the image to be inserted into the document and inputting the keyword of the image that the user wants to generate. On the other hand, in the third embodiment, the information processing apparatus determines the position and the size of the image to be inserted into the document, and the keyword of the image which should be generated. Hereinafter, the case where the information processing apparatus according to the present invention is the general purpose computer 102 will be described, but the information processing apparatus according to the present invention may be the image forming apparatus 100. It should be noted that in the third embodiment, the same components as those in the first embodiment and the second embodiment are denoted by the same reference numerals, and the descriptions thereof will be omitted.

Figure 10A:
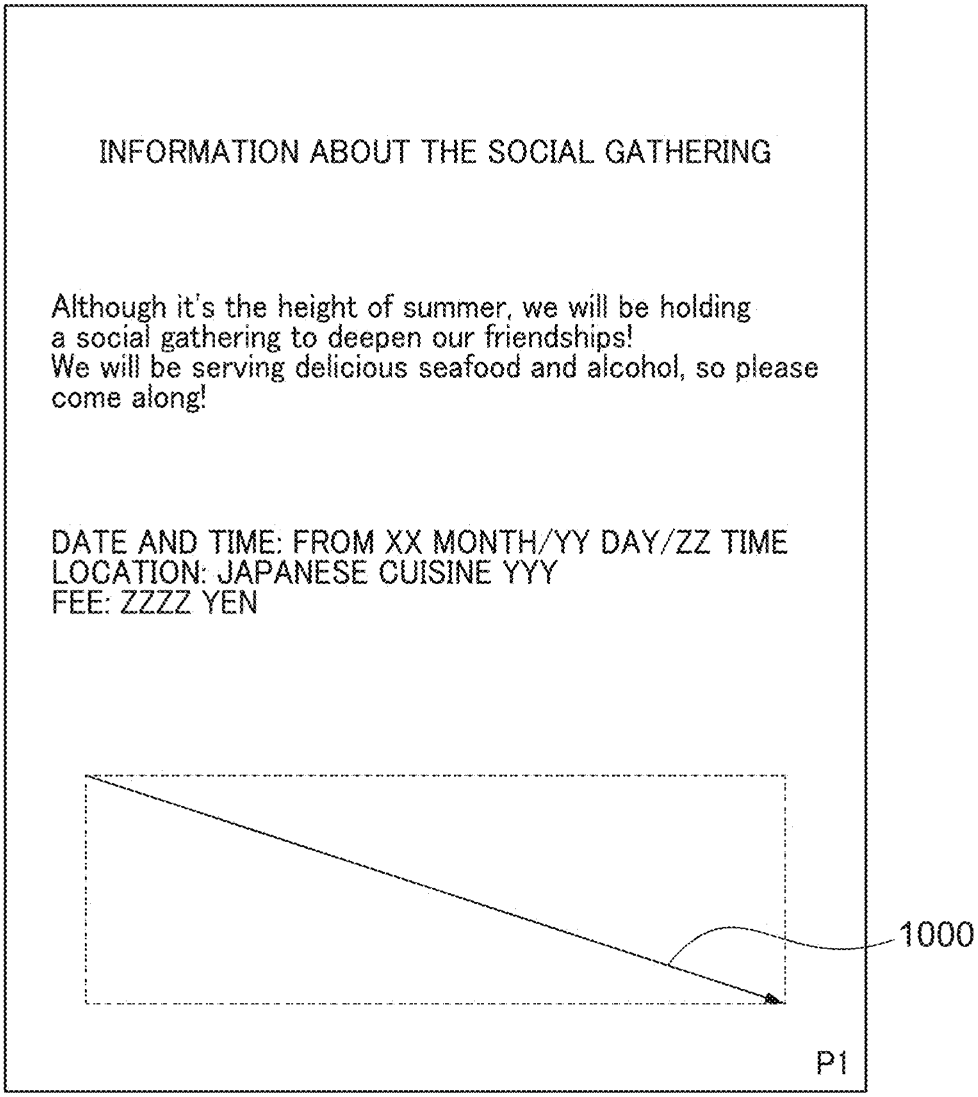
FIGS. 10A and 10B are diagrams for explaining a specific example of an image inserting processing in a third embodiment of the present invention.
Figure 10B:
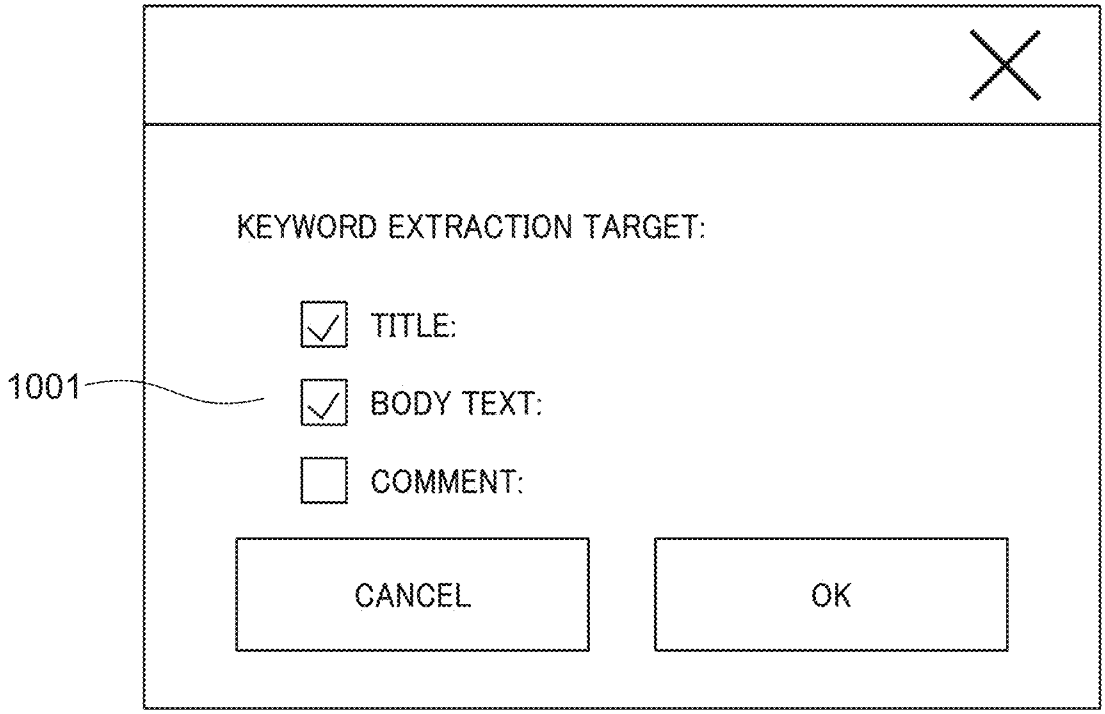

FIGS. 10A and 10B are diagrams for explaining a specific example of an image inserting processing in the third embodiment. In the third embodiment, the CPU 170 analyzes the contents of the document to extract a keyword, and includes the extracted keyword in the AI image generation request as the keyword of the image that the user wants to generate.

FIG. 10A is a diagram that shows a document image being edited by the document editing software of the general purpose computer 102. Information such as a title, a body text, and a page number is inputted (entered) into the document which is an example.

The user designates a region where he or she wants to insert the AI image by using a vector 1000 in the document editing software by means of the second method that has been described in the first embodiment. When the region is designated by the vector 1000, a window shown in FIG. 10B (a keyword extraction target designating UI) is displayed on the display 176. It should be noted that the position and the size at which the user wants to insert the AI image may be designated by means of the first method that has been described in the first embodiment.

FIG. 10B is a diagram that shows a window for designating targets to be analyzed for keyword extraction. The user selects, from among a group of check boxes (a check box group) 1001, target items in the document from which the user wants to extract a keyword. In the third embodiment, as shown in FIG. 10B, as the target items in the document from which the user wants to extract a keyword, the title and the body text have been selected from among the check box group 1001.

Thereafter, when the user presses an OK button (see FIG. 10B), the CPU 170 performs the keyword extraction from character strings included in the items selected from among the check box group 1001 (in the case of the third embodiment, the items selected from among the check box group 1001 are the title and the body text). In the case of the third embodiment, the keyword that is expected to be extracted from the document shown in FIG. 10A is, for example, "social gathering, summer, seafood cuisine, alcohol, Japanese cuisine".

It should be noted that the keyword extraction may be performed by transmitting the image data of the document to be analyzed and the items selected on the window shown in FIG. 10B to an external device such as the image generation server 101 and causing the external device to analyze them.

Since the technique for extracting a keyword from a document by text analysis is publicly known, a detailed description thereof will be omitted here. However, in the case that this technique is applied to the image forming apparatus 100, optical character recognition (OCR) is first executed with respect to the document image (see FIG. 10A), and then the keyword extraction is performed with respect to the obtained character string data.

In the third embodiment, all keywords extracted from the document by text analysis are determined as the keyword of the AI image to be generated, but some of the extracted keywords may be used as the keyword of the AI image to be generated. For example, a plurality of keywords extracted from the document may be obtained in association with scores indicating their importance, and the top several keywords with the highest scores may be used as the keyword of the AI image to be generated. Alternatively, the keywords having a score equal to or greater than a predetermined certain value may be used as the keyword of the AI image to be generated.

After that, the CPU 170 transmits an AI image generation request including the keyword of the AI image extracted described above to the image generation server 101, and causes the GPU 166 to generate an AI image. Thereafter, when the AI image is transmitted from the image generation server 101, the CPU 170 inserts the AI image into the region designated by the vector 1000 in the document image shown in FIG. 10A.

It should be noted that such a configuration may be adopted in which before transmitting the AI image generation request to the image generation server 101, the CPU 170 displays a screen that displays the keywords determined as the keyword of the AI image to be generated and asks the user to confirm them. In the case of this configuration, all keywords extracted from the document may be displayed on a screen in a format that allows the user to identify whether or not they are the keyword of the AI image to be generated, and the user may be able to add and/or delete the keyword of the AI image on the screen.

In addition, in the case that no keyword having a score equal to or greater than the predetermined certain value is obtained, an error screen may be displayed, and a window prompting the user to reconsider the analysis range may be displayed.

The strength of each keyword of the AI image to be generated, which is included in the AI image generation request transmitted to the image generation server 101, may be set to change the ease with which the keyword is reflected in the AI image generated by the GPU 166. For example, the CPU 170 may transmit an AI image generation request, which includes, as the keyword of the AI image to be generated, the keywords whose strengths are weighted according to the scores of the keywords obtained by text analysis, to the image generation server 101.

FIGS. 11A, 11B, 11C, and 11D are diagrams for explaining a first modification of the image inserting processing in the third embodiment. In the first modification, in addition to the configuration that has been described with reference to FIGS. 10A and 10B, on a window that will be described below with reference to FIG. 11C, it becomes possible for the user to designate a range of document analysis for extracting the keyword.

Figure 11B:
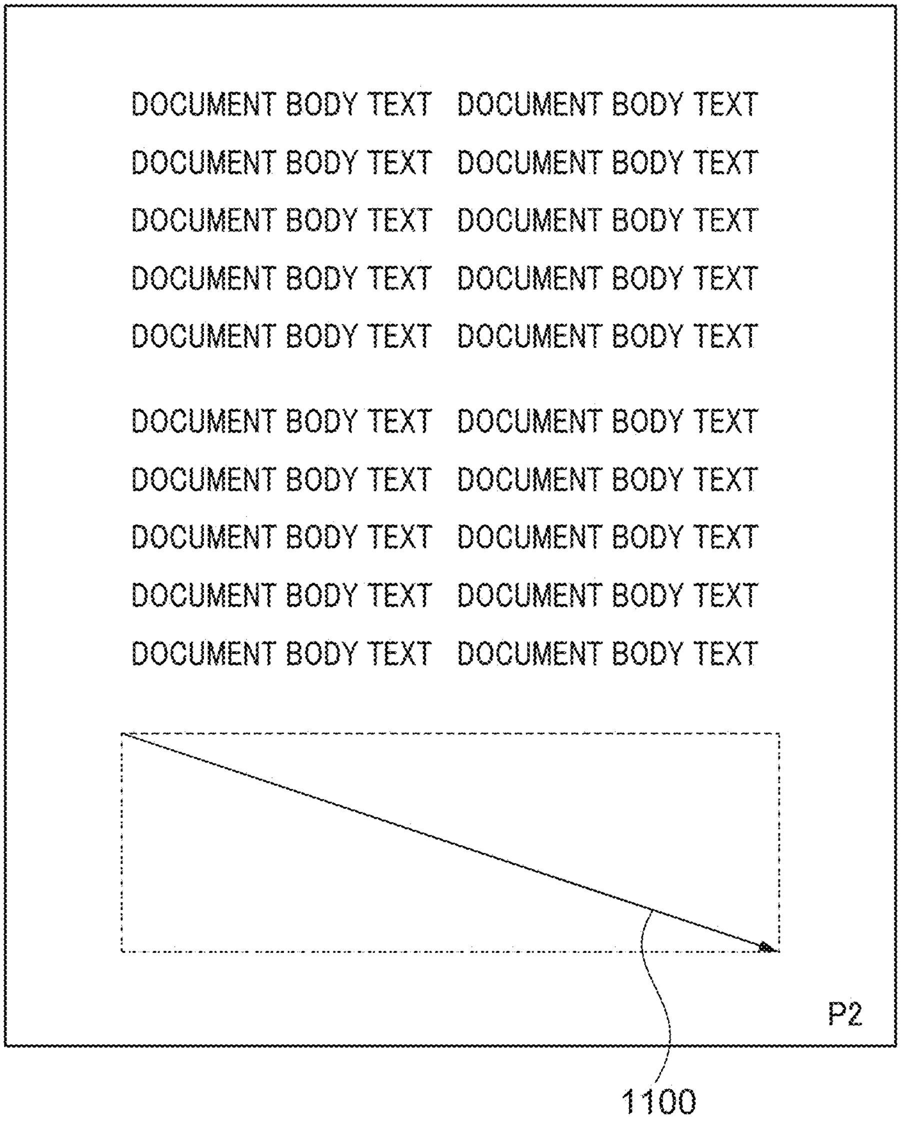

FIG. 11A and FIG. 11B are diagrams that show a document image being edited by the document editing software run on the general purpose computer 102. In the third embodiment, a document consisting of two pages will be described.

The user designates a region where he or she wants to insert the AI image by using a vector 1100 in the document editing software by means of the second method that has been described in the first embodiment. When the region is designated by the vector 1100, the window shown in FIG. 11C (a keyword extraction range designating UI) is displayed on the display 176. It should be noted that the position and the size at which the user wants to insert the AI image may be designated by means of the first method that has been described in the first embodiment.

Figure 11C:
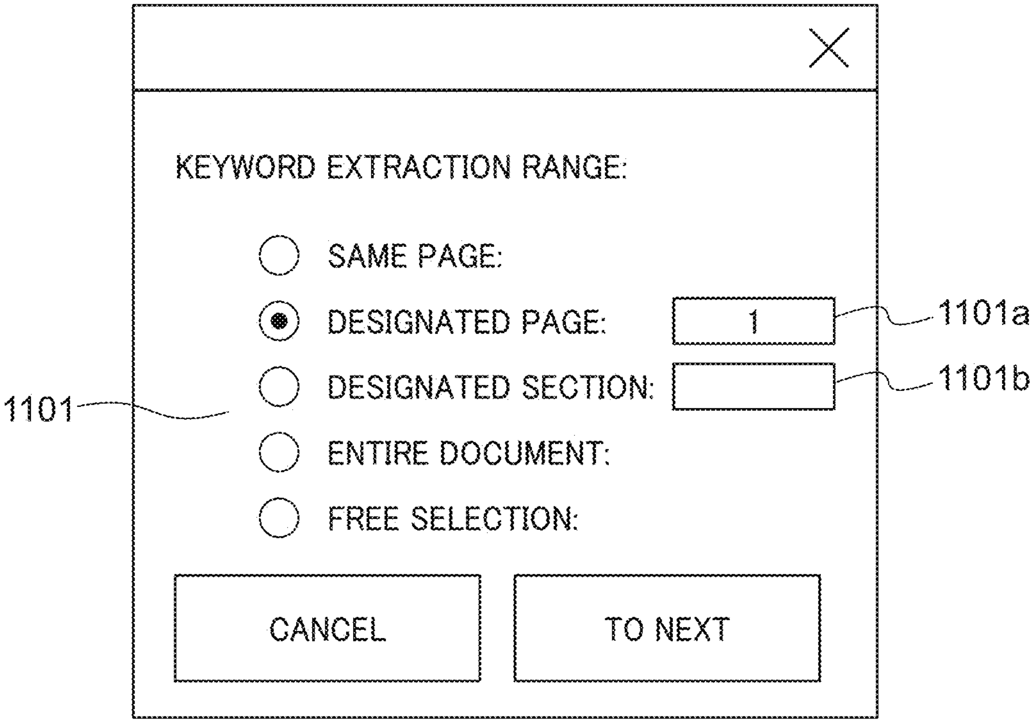

FIG. 11C is a diagram that shows the window for designating the range of document analysis for extracting the keyword (hereinafter, referred to as "a document analysis range". The user selects the document analysis range from among a group of check boxes (a check box group) 1101. In the third embodiment, as shown in FIG. 11C, the document analysis range is configured to allow the user to select one of five ranges ("same page", "designated page", "designated section", "entire document", and "free selection") as the document analysis range.

In the case that "same page" has been selected, the page on which the AI image will be inserted is designated as the document analysis range. In the case that "designated page" has been selected, the page of a separately designated page number (here, a page number inputted into a page number input section 1101*a*) is designated as the document analysis range. In the case that "designated section" has been selected, a chapter or a section specified by a separately designated section number (here, a section number inputted into a section number input section 1101*b*) is designated as the document analysis range. In the case that "entire document" has been selected, the entire document is designated as the document analysis range. In the case that "free selection" has been selected, the user is able to designate a region of the document analysis range, and for example, the user designates the region of the document analysis range by a method of left-dragging to surround a region that the user wants to set as the document analysis range.

Figure 11D:
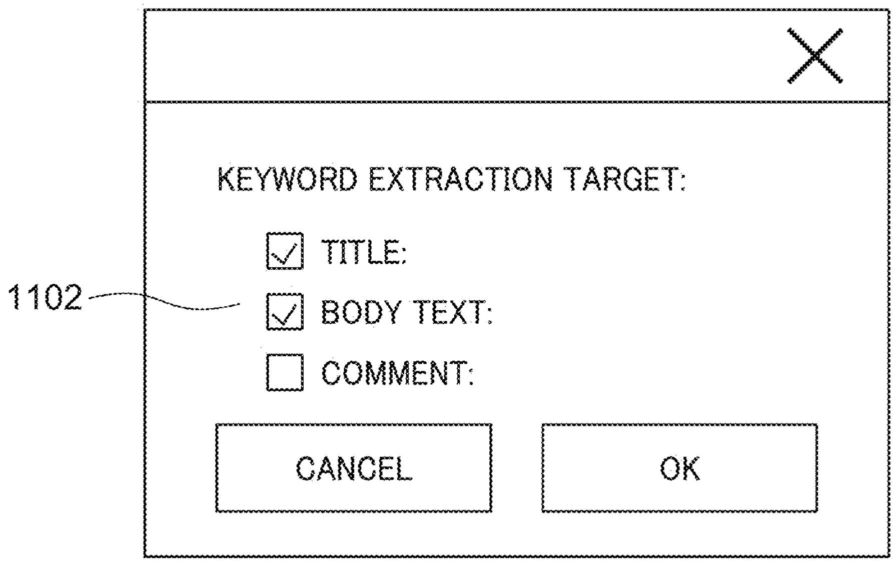

FIG. 11D is a diagram that shows a window for designating targets to be analyzed for keyword extraction. The window shown in FIG. 11D (the keyword extraction target designating UI) has the same configuration as the window shown in FIG. 10B, and the user selects, from among a group of check boxes (a check box group) 1102, target items in the document from which the user wants to extract a keyword. Finally, the items designated by the check box group 1102 (see FIG. 11D) included in the document analysis range designated by the check box group 1101 (see FIG. 11C) are analyzed to extract the keyword.

Figure 12:
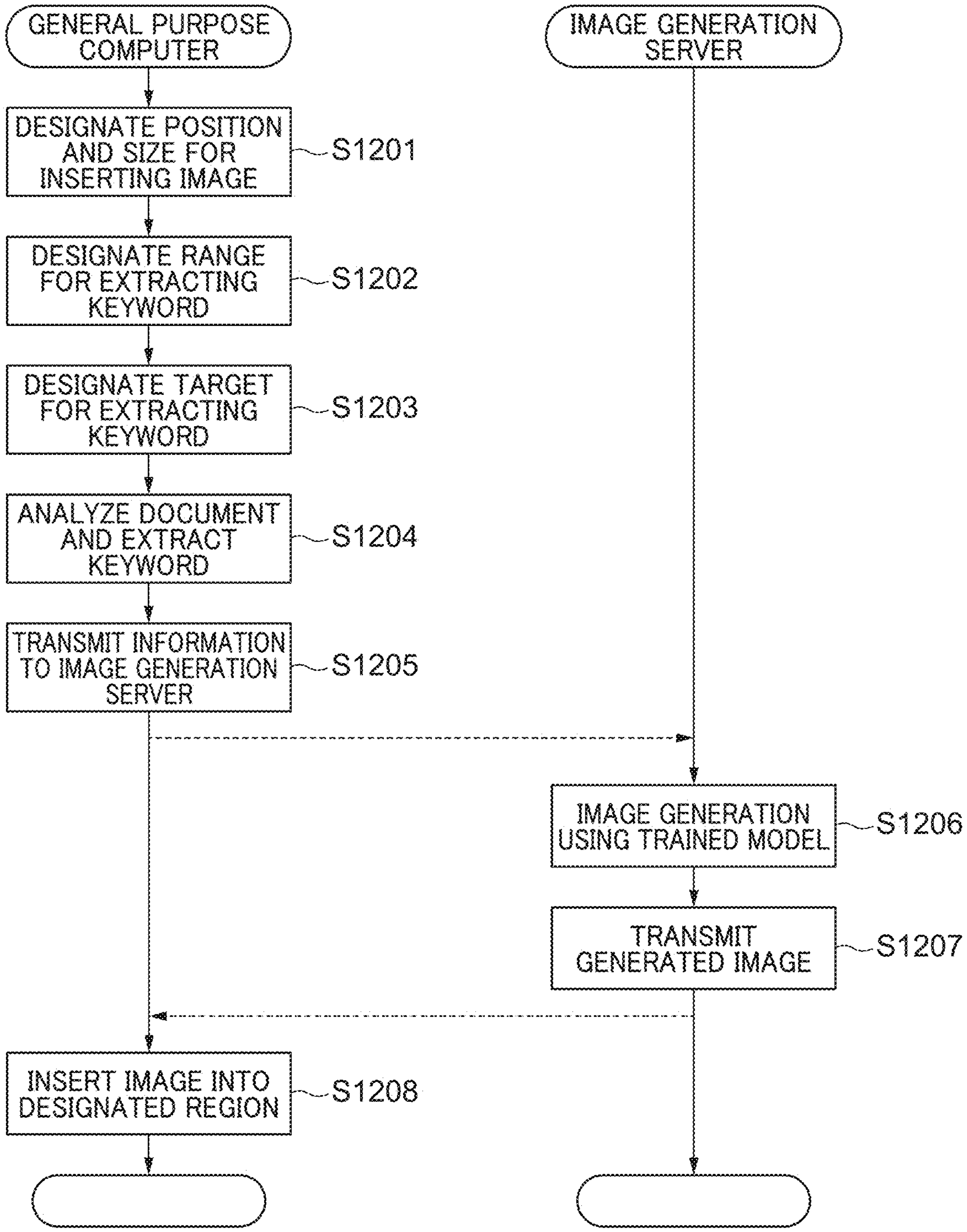
FIG. 12 is a flowchart of the first modification of the image inserting processing, which is executed in the general purpose computer and the image generation server.

FIG. 12 is a flowchart of the first modification of the image inserting processing in the third embodiment, which is executed in the general purpose computer 102 and the image generation server 101. The processing on the general purpose computer 102 side (processes of steps S1201 to S1205, and S1208) is executed by the CPU 170 loading the program stored in the ROM 172 into the RAM 171. In addition, the processing on the image generation server 101 side (processes of steps S1206 and S1207) is executed by the CPU 160 loading the program stored in the ROM 162 into the RAM 161.

The image inserting processing shown in FIG. 12 starts when the user selects the image generation button (not shown).

In the step S1201, similar to the step S201, waiting for designating the position and the size (the region) of an image to be inserted into the document image by a user operation of the input device 175. Specifically, waiting for the user to designate the region for inserting the AI image by inputting the vector 1100 (see FIG. 11B) into the document image. When the user designates the position and the size (the region) of the image to be inserted into the document image, the image inserting processing shown in FIG. 12 proceeds to the step S1202.

In the step S1202, the window shown in FIG. 11C is displayed on the display 176, and waiting for the user to designate the document analysis range.

Depending on the configuration, a fixed setting may be used and this step may be skipped. When the user designates the document analysis range, the image inserting processing shown in FIG. 12 proceeds to the step S1203.

In the step S1203, the window shown in FIG. 11D is displayed on the display 176, and waiting for the user to designate a keyword extraction target that is included in the document analysis range designated in the step S1202. Depending on the configuration, a fixed setting may be used and this step may be skipped. When the user designates the keyword extraction target, the image inserting processing shown in FIG. 12 proceeds to the step S1204.

In the step S1204, the text analysis is performed with respect to the keyword extraction target designated in the step S1203 that is included in the document analysis range designated in the step S1202 in the document, and the keyword of the AI image to be generated is extracted. After that, the image inserting processing shown in FIG. 12 proceeds to the step S1205.

In the step S1205, an AI image generation request including the size of the image to be generated inputted in the step S1201 and information on the keyword of the AI image to be generated obtained in the step S1204 is transmitted to the image generation server 101. After that, the image inserting processing shown in FIG. 12 proceeds to the step S1206.

After that, the user may be able to continue performing document editing on the general purpose computer 102 until the image inserting processing shown in FIG. 12 proceeds to the step S1208.

In the step S1206, the image generation server 101 causes the GPU 166 to generate an AI image in response to the AI image generation request received from the general purpose computer 102 via the LAN 103. In addition, in the case that the image generation is already being processed in the image generation server 101 due to another AI image generation request, the requests received earlier will be processed sequentially, and the processing of the relevant request will wait until its turn comes. After that, the image inserting processing shown in FIG. 12 proceeds to the step S1207.

In the step S1207, the image generation server 101 transmits image data of the AI image generated in the step S1206 to the general purpose computer 102 via the LAN 103. After that, the image inserting processing shown in FIG. 12 proceeds to the step S1208.

In the step S1208, the AI image obtained from the image generation server 101 is inserted into the position designated in the step S1201 on the document image, and the image inserting processing shown in FIG. 12 ends.

Figure 13A:
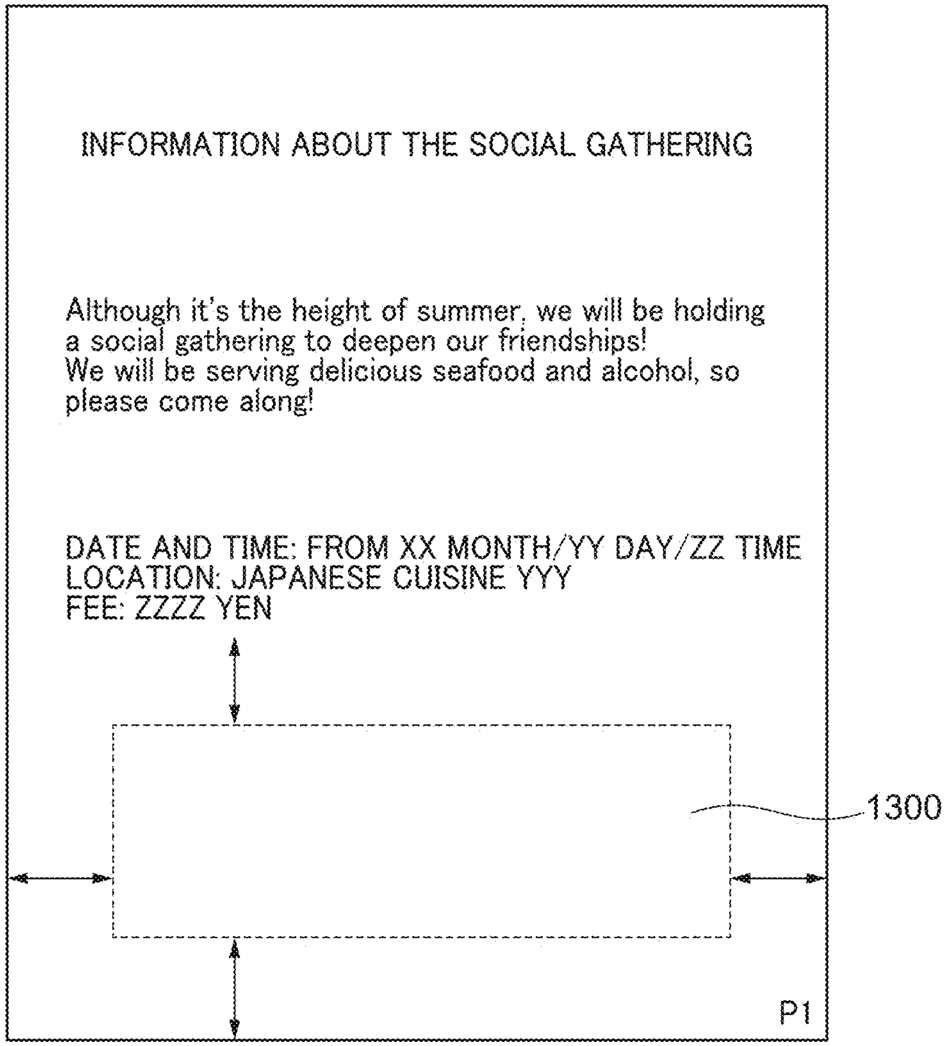
FIGS. 13A and 13B are diagrams for explaining a second modification of the image inserting processing in the third embodiment of the present invention.
Figure 13B:
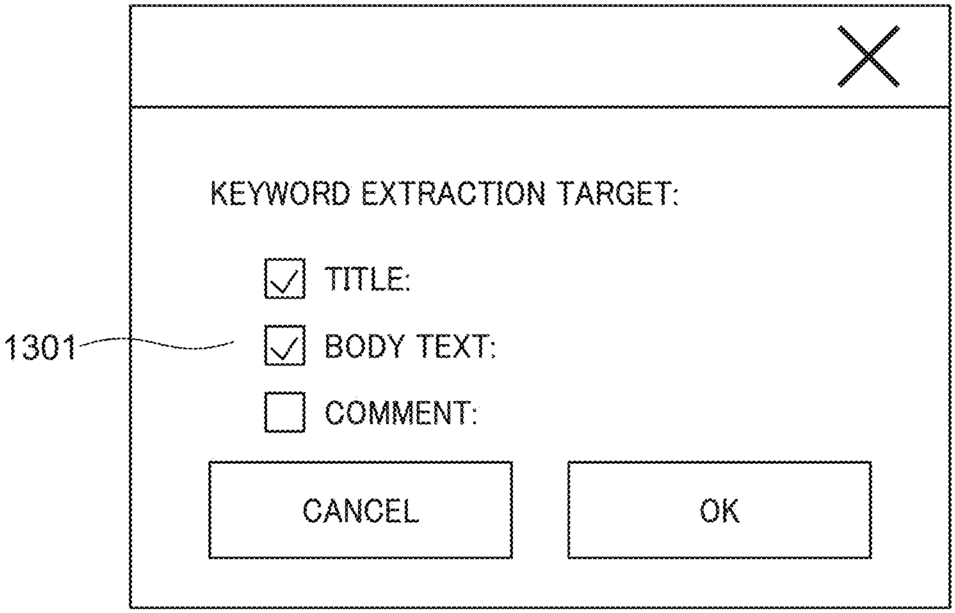

FIGS. 13A and 13B are diagrams for explaining a second modification of the image inserting processing in the third embodiment. In the second modification, a document image is analyzed to detect a free region into which an AI image is capable of being inserted, the size of the detected free region is set to the size of the AI image to be generated, and the generated AI image is inserted into the detected free region.

FIG. 13A is a diagram that shows a document image being edited by the document editing software of the general purpose computer 102. Information such as a title, a body text, and a page number is inputted (entered) into the document which is an example. In addition, there is a margin region at the bottom of this document.

In the second modification, when the user instructs the generation of an AI image to be inserted into the document, the CPU 170 detects a region suitable for inserting an AI image to be generated (the free region into which an AI image is capable of being inserted) from the document image, and generates an AI image generation request by using the detection result. As a result, the user does not need to designate the position and the size for inserting the AI image into the document image. In the third embodiment, as the region suitable for inserting the image, a maximum rectangular region 1300, which is a free region in the document image and is included in a region made up of pixels that are a certain distance away from some element such as the edge of the page, the body text, and another image, is detected.

In addition, the user may be allowed to input a size for automatically dividing the detected rectangular region (that is, when the detected rectangular region becomes equal to or larger than this size, the region is divided). Alternatively, in the case that the detected rectangular region is equal to or larger than a fixed value, the region may be divided.

FIG. 13B is a diagram that shows a window for designating targets to be analyzed for keyword extraction. Similar to the window shown in FIG. 10B, the user selects, from among a group of check boxes (a check box group) 1301, target items in the document from which the user wants to extract a keyword.

Thereafter, when the user presses an OK button (see FIG. 13B), the CPU 170 performs the keyword extraction from character strings included in the items selected from among the check box group 1301 (in the case of the third embodiment, the items selected from among the check box group 1301 are the title and the body text).

After that, the CPU 170 transmits an AI image generation request, which includes the size of the detected region suitable for inserting the AI image to be generated and the extracted keyword, to the image generation server 101. As mentioned above, in the case that the region for generating the AI image is divided into a plurality of regions, a plurality of AI image generation requests corresponding to the respective regions may be transmitted.

Moreover, the keyword may be designated by the user inputting it as in the first embodiment, or may be configured to allow the user to designate which range of the document is to be analyzed for keyword extraction as in the third embodiment.

Figure 14:
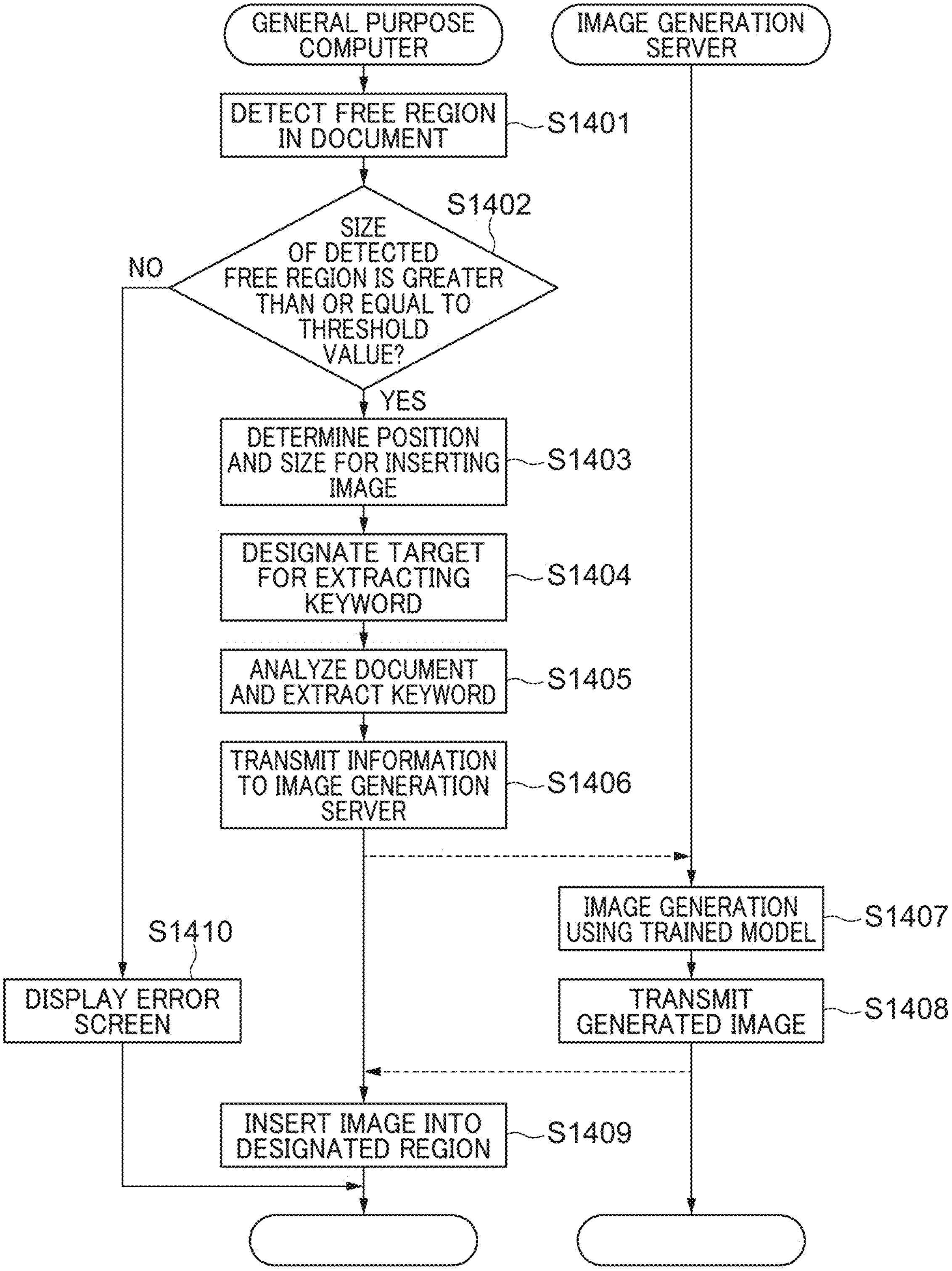
FIG. 14 is a flowchart of the second modification of the image inserting processing, which is executed in the general purpose computer and the image generation server.

FIG. 14 is a flowchart of an image inserting processing in the second modification of the third embodiment that has been described with reference to FIGS. 13A and 13B, which is executed in the general purpose computer 102 and the image generation server 101. The processing on the general purpose computer 102 side (processes of steps S1401 to S1406, S1409, and S1410) is executed by the CPU 170 loading the program stored in the ROM 172 into the RAM 171. In addition, the processing on the image generation server 101 side (processes of steps S1407 and S1408) is executed by the CPU 160 loading the program stored in the ROM 162 into the RAM 161.

The image inserting processing shown in FIG. 14 starts when the user selects the image generation button (not shown).

In the step S1401, the CPU 170 analyzes (detects) a free region in the document. After that, the image inserting processing shown in FIG. 14 proceeds to the step S1402.

In the step S1402, the CPU 170 determines whether or not the size of the free region detected in the step S1401 is equal to or larger than a threshold value. In the case that the size of the free region detected in the step S1401 is equal to or larger than the threshold value (YES in the step S1402), the CPU 170 determines that the free region detected in the step S1401 is a free region large enough for inserting the AI image, and the image inserting processing shown in FIG. 14 proceeds to the step S1403. On the other hand, in the case that only free region having a size less than the threshold value is detected (NO in the step S1402), the image inserting processing shown in FIG. 14 proceeds to the step S1410.

In the step S1403, the CPU 170 determines the position and the size of the image to be inserted into the document (the rectangular region 1300 shown in FIG. 13A) based on the position and the size of the free region detected in the step S1401, and stores them in the RAM 171. After that, the image inserting processing shown in FIG. 14 proceeds to the step S1404.

In the step S1404, waiting for the user to designate which item in the document is to be the keyword extraction target, that is, waiting for the user to select from among the checkbox group 1301 shown in FIG. 13B. Depending on the configuration, a fixed setting may be used and this step may be skipped. When the user selects at least one item from among the checkbox group 1301 and then presses the OK button (see FIG. 13B), the image inserting processing shown in FIG. 14 proceeds to the step S1405.

In the step S1405, the CPU 170 performs the text analysis with respect to the items in the document designated by the user in the step S1404, extracts a keyword, and sets the extracted keyword as the keyword of the image to be generated by the image generation server 101. After that, the image inserting processing shown in FIG. 14 proceeds to the step S1406.

In the step S1406, the CPU 170 transmits, to the image generation server 101, an AI image generation request including the size of the image to be inserted into the document stored in the RAM 171 in the step S1403 and information on the keyword of the image to be generated that has been set in the step S1405. After that, the image inserting processing shown in FIG. 14 proceeds to the step S1407.

After that, the user may be able to continue performing document editing on the general purpose computer 102 until the image inserting processing shown in FIG. 14 proceeds to the step S1409.

In the step S1407, the image generation server 101 causes the GPU 166 to execute the image generation program 165 in response to the AI image generation request received from the general purpose computer 102 via the LAN 103, and generate an AI image. In addition, in the case that the image generation is already being processed in the image generation server 101 due to another AI image generation request, the requests received earlier will be processed sequentially, and the processing of the relevant request will wait until its turn comes. After that, the image inserting processing shown in FIG. 14 proceeds to the step S1408.

In the step S1408, the image generation server 101 transmits image data of the AI image generated in the step S1407 to the general purpose computer 102 via the LAN 103. After that, the image inserting processing shown in FIG. 14 proceeds to the step S1409.

In the step S1409, the AI image obtained from the image generation server 101 is inserted into the position on the document image stored in the RAM 171 in the step S1403, and the image inserting processing shown in FIG. 14 ends.

In the step S1410, an error screen notifying the user that no region large enough for inserting the AI image into the document has been found is displayed, the image generation server 101 does not perform the generation of the AI image, and the image inserting processing shown in FIG. 14 ends.

Although details are omitted, the various configurations described in the first embodiment and the second embodiment are also applicable to the third embodiment.

By the above procedures, in the third embodiment, based on the document image, the CPU 170 determines the region into which the AI image should be inserted and the keyword to be used in the generation of the AI image, and based on these pieces of information, the AI image is generated by the image generation server 101 and inserted into the document. As a result, in the third embodiment, it is possible to further reduce the user's labor in editing documents compared to the first embodiment and the second embodiment.

It should be noted that, in the embodiments of the present invention, it is also possible to implement processing in which a program for implementing one or more functions is supplied to a computer of a system or an apparatus via a network or a storage medium, and a system control unit of the system or the apparatus reads out and executes the program. The system control unit may include one or more processors or circuits, and in order to read out and execute executable instructions, the system control unit may include multiple isolated system control units or a network of multiple isolated processors or circuits.

The processor or circuit may include a central processing unit (CPU), a micro processing unit (MPU), a graphics processing unit (GPU), an application-specific integrated circuit (ASIC), and/or a field-programmable gate array (FPGA). In addition, the processor or circuit may include a digital signal processor (DSP), a data flow processor (DFP), or a neural processing unit (NPU).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-147574, filed on Sep. 12, 2023, which is hereby incorporated by reference herein in its entirety.

What is claimed is:

1. An information processing apparatus comprising:
- a region designating device that designates a region for inserting an AI image from an image;
- a first keyword obtaining device that obtains a keyword of the AI image;
- at least one processor; and
- a memory coupled to the processor, the memory storing instructions that, when executed by the processor, cause the processor to function as:
- (1) an AI image obtaining unit that obtains an AI image generated by inputting input data including the obtained keyword into a trained model; and
- (2) an inserting unit that inserts the obtained AI image into the designated region of the image,
- wherein in response to an instruction to generate an AI image to be inserted into the image from a user, (1) the image is displayed on a region designating UI, (2) a user designation of the region in the displayed image is accepted by the region designating UI, and (3) a user input of information on the AI image is accepted by an AI image information designating UI, and wherein the first keyword obtaining device obtains the keyword inputted by the user by the AI image information designating UI.

2. The information processing apparatus according to claim 1, wherein the region designating device;

determines a position of the region based on coordinates designated by the user with respect to the image displayed on the region designating UI, and obtains a size of the region inputted by the user by the AI image information designating UI.

3. The information processing apparatus according to claim 1, wherein the region designating device determines a position and a size of the region based on a vector designated by the user with respect to the image displayed on the region designating UI.

4. The information processing apparatus according to claim 1, wherein the region designating UI performs an enlarged display of a part of the image in response to a user operation.

5. The information processing apparatus according to claim 1, wherein the region designating device designates the region based on a free region detected by analyzing the image.

6. The information processing apparatus according to claim 1, wherein the AI image is displayed as an already-generated image in the designated region of the image displayed on the region designating UI.

7. The information processing apparatus according to claim 6, wherein the input data includes a seed value, wherein the AI image obtaining unit, when the already-generated image displayed on the region designating UI is selected by the user, obtains an AI image regenerated by inputting input data including a seed value different from the seed value, a size of the designated region, and the obtained keyword into the trained model, and wherein the inserting unit replaces the already-generated image with the regenerated AI image.

8. The information processing apparatus according to claim 7, wherein the already-generated image displayed on the region designating UI is updated to the regenerated AI image.

9. The information processing apparatus according to claim 6, wherein the input data includes a seed value, wherein when the already-generated image displayed on the region designating UI is selected by the user, a user input of a regeneration keyword is accepted by a redesignating UI, wherein the AI image obtaining unit obtains an AI image regenerated by inputting input data including the seed value, a size of the designated region, and the obtained regeneration keyword into the trained model, and wherein the inserting unit replaces the already-generated image with the regenerated AI image.

10. The information processing apparatus according to claim 9, wherein the already-generated image displayed on the region designating UI is updated to the regenerated AI image.

11. The information processing apparatus according to claim 1, wherein the first keyword obtaining device;

accepts a user designation of a target item from which the keyword is to be extracted by a keyword extraction target designating UI in response to the instruction to generate an AI image to be inserted into the image from a user, and extracts the keyword by performing text analysis on the user-designated target item of the image.

12. The information processing apparatus according to claim 1, wherein the first keyword obtaining device;

accepts a user designation of one of same page, designated page, designated section, entire document, and free selection as a range for extracting the keyword from the image by a keyword extraction range designating UI in response to the instruction to generate an AI image to be inserted into the image from a user, accepts a user designation of a target item from which the keyword is to be extracted by a keyword extraction target designating UI, and extracts the keyword by performing text analysis on the user-designated target item in the user-designated range of the image.

13. The information processing apparatus according to claim 1, wherein the AI image obtaining unit:

transmits an AI image generation request including a size of the designated region and the obtained keyword to an image generation server, and obtains the AI image generated in response to the AI image generation request from the image generation server.

14. The information processing apparatus according to claim 13, wherein the information processing apparatus is an image forming apparatus.

15. The information processing apparatus according to claim 14, wherein the processor is caused to further function as an image obtaining unit that obtains the image by reading an original image with a reading unit.

16. A control method for an information processing apparatus, the control method comprising:

a region designating step of designating a region for inserting an AI image from an image;

a first keyword obtaining step of obtaining a keyword of the AI image;

an AI image obtaining step of obtaining an AI image generated by inputting input data including the obtained keyword into a trained model; and an inserting step of inserting the obtained AI image into the designated region of the image, wherein in response to an instruction to generate an AI image to be inserted into the image from a user, (1) the image is displayed on a region designating UI, (2) a user designation of the region in the displayed image is accepted by the region designating UI, and (3) a user input of information on the AI image is accepted by an AI image information designating UI, and wherein the first keyword obtaining step obtains the keyword inputted by the user by the AI image information designating UI.

17. A non-transitory computer-readable storage medium storing a program for causing a computer to execute a control method for an information processing apparatus, the control method comprising:

a region designating step of designating a region for inserting an AI image from an image;

a first keyword obtaining step of obtaining a keyword of the AI image;

an AI image obtaining step of obtaining an AI image generated by inputting input data including the obtained keyword into a trained model; and an inserting step of inserting the obtained AI image into the designated region of the image, wherein in response to an instruction to generate an AI image to be inserted into the image from a user, (1) the image is displayed on a region designating UI, (2) a user designation of the region in the displayed image is accepted by the region designating UI, and (3) a user input of information on the AI image is accepted by an AI image information designating UI, and wherein the first keyword obtaining step obtains the keyword inputted by the user by the AI image information designating UI.

* * * * *